US010775245B2

(12) United States Patent
Uno et al.

(10) Patent No.: US 10,775,245 B2
(45) Date of Patent: Sep. 15, 2020

(54) TEMPERATURE MEASUREMENT DEVICE, TEMPERATURE MEASUREMENT METHOD, AND COMPUTER-READABLE NON-TRANSITORY MEDIUM

(71) Applicant: FUJITSU LIMITED, Kawasaki-shi, Kanagawa (JP)

(72) Inventors: Kazushi Uno, Atsugi (JP); Takeo Kasajima, Machida (JP); Takahiro Arioka, Isehara (JP); Hiroyuki Fukuda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 393 days.

(21) Appl. No.: 15/789,381

(22) Filed: Oct. 20, 2017

(65) Prior Publication Data

US 2018/0058947 A1  Mar. 1, 2018

Related U.S. Application Data

(63) Continuation of application No. PCT/JP2015/063836, filed on May 13, 2015.

(51) Int. Cl.
*G01K 11/32* (2006.01)

(52) U.S. Cl.
CPC ........ *G01K 11/32* (2013.01); *G01K 2011/324* (2013.01)

(58) Field of Classification Search
CPC ...... G01K 15/00; G01K 11/3206; G01K 3/06; G01K 11/32; G01K 2011/324;
(Continued)

(56) References Cited

U.S. PATENT DOCUMENTS 4,823,166 A    4/1989  Hartog
5,054,935 A *  10/1991 Tanabe ................. G01K 11/32
                                              250/227.14
(Continued)

FOREIGN PATENT DOCUMENTS

CN    106226284 A  * 12/2016
JP    S62-110160 A    5/1987
(Continued)

OTHER PUBLICATIONS

Office Action of Australian Patent Application No. 2015394726 dated Feb. 27, 2019 (3 pages).
(Continued)

*Primary Examiner* — Gail Kaplan Verbitsky
(74) *Attorney, Agent, or Firm* — Kratz, Quintos & Hanson, LLP

(57) ABSTRACT

A temperature measurement device includes: a light source configured to input a light into an optical fiber; a detector configured to detect a Stokes component and an anti-Stokes component from a back scattering light from the optical fiber; a memory; and a processor configured to execute a process, the process comprising: in a predetermined region including a sample point of the optical fiber, calculating a range including the sample point in accordance with a largeness of a correlation between the Stokes component and the anti-Stokes component; smoothing the Stokes component and the anti-Stokes component in the range; and measuring a temperature of the sample point with use of the Stokes component and the anti-Stokes component that are smoothed by the corrector.

17 Claims, 46 Drawing Sheets

(58) Field of Classification Search
CPC ........... G01K 2213/00; G01D 5/35364; G01D 5/353; G01D 5/35303; G01D 5/3538; G01D 5/25; G01N 2021/4742; G01N 21/65; A61B 1/0008; A61B 1/00096; A61B 1/00172; G01B 2290/65
USPC ............. 374/130, 131, 137, 1, 2; 356/43, 44
See application file for complete search history.

(56) References Cited

U.S. PATENT DOCUMENTS

| | | | | |
|---|---|---|---|---|
| 5,272,334 | A * | 12/1993 | Sai | G01K 11/32 250/227.18 |
| 5,618,108 | A * | 4/1997 | Sai | G01K 11/32 250/227.14 |
| 5,765,948 | A * | 6/1998 | Sai | G01K 11/32 250/227.14 |
| 7,126,680 | B2 * | 10/2006 | Yamate | G01K 11/32 356/73.1 |
| 7,215,416 | B2 * | 5/2007 | Yamate | G01K 11/32 356/73.1 |
| 7,431,341 | B2 * | 10/2008 | McIntyre | F16L 13/0263 285/370 |
| 9,689,751 | B2 * | 6/2017 | Shida | G01K 11/32 |
| 2006/0239330 | A1 * | 10/2006 | Yamate | G01K 15/00 374/161 |
| 2014/0241396 | A1 | 8/2014 | Shida | |
| 2015/0063418 | A1 * | 3/2015 | Wysocki | G01K 11/32 374/161 |
| 2016/0168980 | A1 * | 6/2016 | Bedry | G01K 15/005 374/136 |
| 2016/0258808 | A1 * | 9/2016 | Cedilnik | G01J 1/0425 |
| 2019/0277707 | A1 * | 9/2019 | Lecoeuche | G01K 11/32 |

FOREIGN PATENT DOCUMENTS

| | | |
|---|---|---|
| JP | H02-123304 A | 5/1990 |
| JP | H05-157638 A | 6/1993 |
| JP | H07-12655 A | 1/1995 |
| JP | 2002-267242 A | 9/2002 |
| JP | 2003-014554 A | 1/2003 |
| JP | 2003-057126 A | 2/2003 |
| JP | 2011-209121 A | 10/2011 |
| JP | 2013-125331 A | 6/2013 |
| JP | 2014-167399 A | 9/2014 |

OTHER PUBLICATIONS

Office Action in Chinese Application No. 201580079670.X, dated Feb. 14, 2019, including English translation.
Office Action of Australian Patent Application No. 2015394726: First Examination Report dated Oct. 11, 2018 (3 pages).
Office Action of Japanese Patent Application No. 2017-517554 dated Nov. 6, 2018 (2 pages, 2 pages translation, 4 pages total).
International Search Report for International Application No. PCT/JP2015/063836 dated Jun. 16, 2015.
Written Opinion of the International Searching Authority for International Application No. PCT/JP2015/063836 dated Jun. 16, 2015 (3 Sheets, 2 Sheets translation, 5 Sheets total).

* cited by examiner

FIG. 11

|  | AVERAGE (LOOP METHOD) | INCIDENT TO 0 (m) | INCIDENT TO L (m) |
|---|---|---|---|
| 100~200m | ±6.2 | ±0.8 | ±11.7 |
| 2800~2900m | ±1.9 | ±2.2 | ±3.0 |
| 5600~5700m | ±5.7 | ±11.3 | ±0.9 |

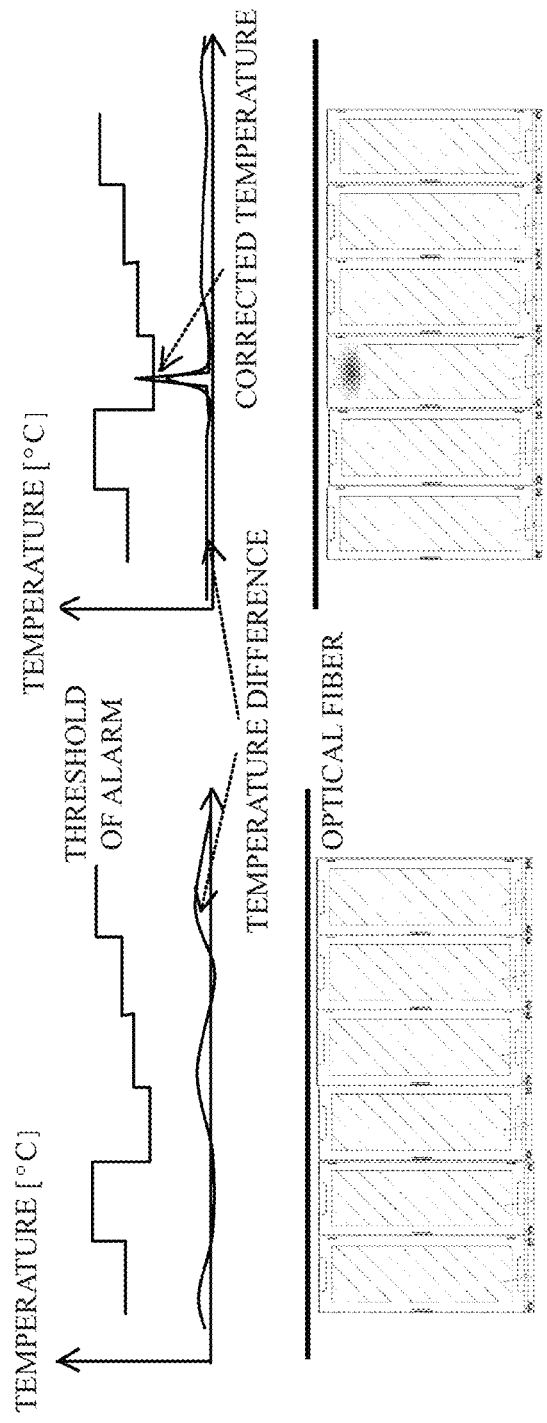

FIG. 34

|  | AVERAGE (LOOP METHOD) | INCIDENT TO 0 (m) | INCIDENT TO L (m) |
|---|---|---|---|
| 100~200m | ±1.6 −73% | ±0.6 −25% | ±3.1 −73% |
| 2800~2900m | ±1.0 −47% | ±1.2 −47% | ±1.4 −54% |
| 5600~5700m | ±1.5 −73% | ±3.0 −74% | ±0.7 −19% |

FIG. 37

|  | AVERAGE (LOOP METHOD) | INCIDENT TO 0 (m) | INCIDENT TO L (m) |
|---|---|---|---|
| 300~400m | ±11.6 | ±1.5 | ±22.8 |
| 2800~2900m | ±3.3 | ±3.9 | ±4.8 |
| 5830~5920m | ±15.1 | ±29.6 | ±2.1 |

FIG. 46

|  | AVERAGE (LOOP METHOD) | INCIDENT TO 0 (m) | INCIDENT TO L (m) |
|---|---|---|---|
| 300~400m | ±4.1 -65% | ±0.8 -47% | ±7.9 -65% |
| 2800~2900m | ±0.9 -73% | ±1.3 -67% | ±1.2 -75% |
| 5830~5920m | ±6.2 -59% | ±11.5 -61% | ±1.8 -14% |

TEMPERATURE MEASUREMENT DEVICE, TEMPERATURE MEASUREMENT METHOD, AND COMPUTER-READABLE NON-TRANSITORY MEDIUM

CROSS-REFERENCE TO RELATED APPLICATIONS

This application is a continuation application of and claim priority to International Application No. PCT/JP2015/063836 filed on May 13, 2015 and designated the U.S., the entire contents of which are incorporated herein by reference.

FIELD

A certain aspect of the embodiments is related to a temperature measurement device, a temperature measurement method and a computer-readable non-transitory medium.

BACKGROUND

There is developed a technology in which a temperature of an optical fiber is measured with use of a back Raman scattering light from the optical fiber when a light is input into the optical fiber from a light source (for example, see Patent Documents 1 to 6).

PRIOR ART DOCUMENT

Patent Document

Patent Document 1: Japanese Laid-open Patent Publication No. 2003-14554
Patent Document 2: Japanese Laid-open Patent Publication No. 2003-57126
Patent Document 3: Japanese Laid-open Patent Publication No. S62-110160
Patent Document 4: Japanese Laid-open Patent Publication No. H07-12655
Patent Document 5: Japanese Laid-open Patent Publication No. H02-123304
Patent Document 6: Japanese Laid-open Patent Publication No. 2002-267242

SUMMARY

According to an aspect of the present invention, there is provided a temperature measurement device including: a light source configured to input a light into an optical fiber; a detector configured to detect a Stokes component and an anti-Stokes component from a back scattering light from the optical fiber; a memory; and a processor configured to execute a process, the process comprising: in a predetermined region including a sample point of the optical fiber, calculating a range including the sample point in accordance with a largeness of a correlation between the Stokes component and the anti-Stokes component; smoothing the Stokes component and the anti-Stokes component in the range; and measuring a temperature of the sample point with use of the Stokes component and the anti-Stokes component that are smoothed by the corrector.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 quantitatively illustrates a measured temperature;
FIG. 22A and FIG. 22B illustrate another example.

FIG. 34 illustrates a quantitative comparison of each temperature distribution after a process of FIG. 28 to FIG. 33, with respect to FIG. 11;

FIG. 37 illustrates each measurement accuracy corresponding to FIG. 11;

FIG. 46 illustrates measurement accuracy calculated from each waveform of FIG. 40A to FIG. 45 and a reduction rate with respect to FIG. 37.

DESCRIPTION OF EMBODIMENTS

The following is a description of embodiments, with reference to the accompanying drawings.

Embodiment

Figure 1A:
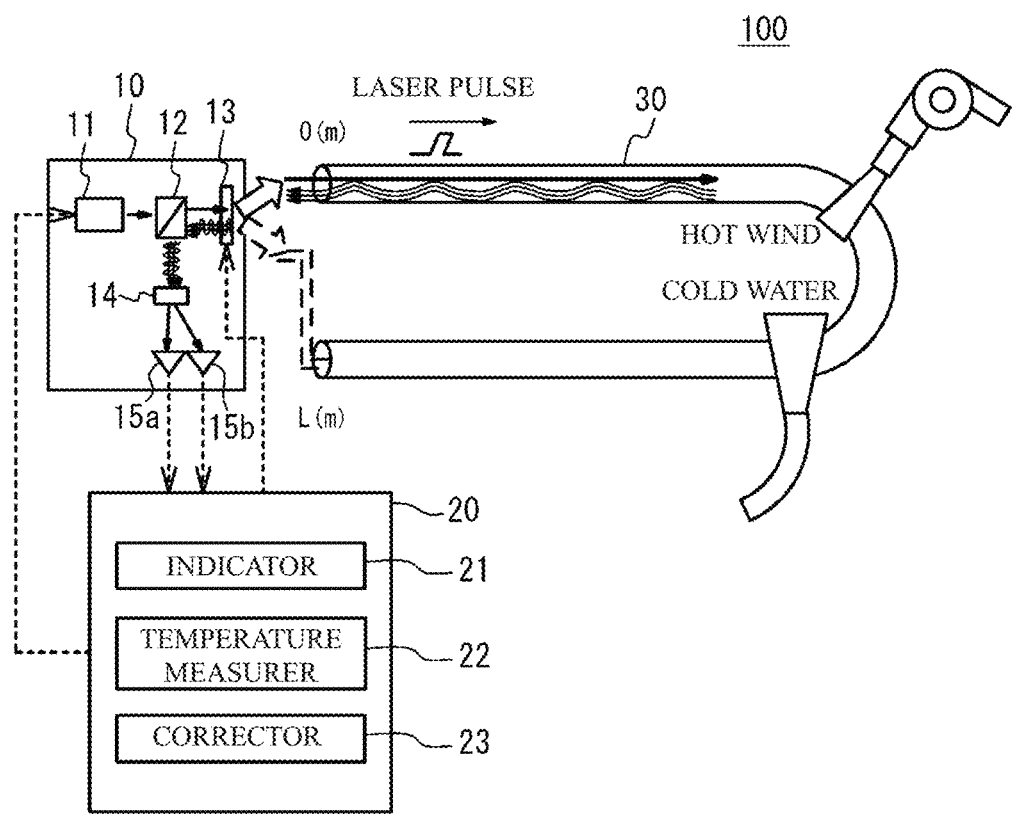
FIG. 1A schematically illustrates an overall structure of a temperature measurement device in accordance with an embodiment.

FIG. 1A schematically illustrates an overall structure of a temperature measurement device 100 in accordance with an embodiment. As illustrated in FIG. 1A, the temperature measurement device 100 has a measurement device 10, a controller 20 and so on. The temperature measurement device 100 is coupled with an optical fiber 30. The measurement device 10 has a laser 11, a beam splitter 12, an optical switch 13, a filter 14, a plurality of detectors 15a and 15b, and so on. The controller 20 has an indicator 21, a temperature measurer 22, a corrector 23 and so on.

Figure 1B:
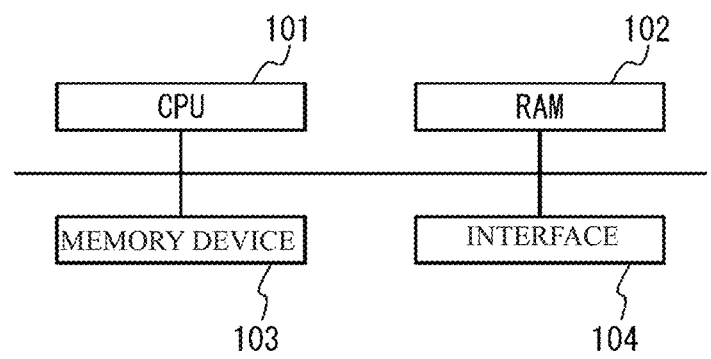
FIG. 1B illustrates a block diagram of a hardware structure of a temperature measurement device.

FIG. 1B illustrates a block diagram of a hardware structure of the controller 20. As illustrated in FIG. 1B, the controller 20 has a CPU 101, a RAM 102, a memory device 103, an interface 104 and so on. The components are connected by a bus or the line. The CPU 101 (Central Processing Unit) is a central processing unit. The CPU 101 has one or more cores. The RAM (Random Access Memory) 102 is a volatile memory that temporarily stores a program executed by the CPU 101, a data processed by the CPU 101, and so on. The memory device 103 is a non-volatile storage device. The memory device 103 may be a ROM (Read Only Memory), a solid state drive (SSD) such as a flash memory, or a hard disk driven by a hard disk drive. When the CPU 101 executes a temperature measurement program stored in the memory device 103, the indicator 21, the temperature measurer 22, the corrector 23 and so on are established in the controller 20. The indicator 21, the temperature measurer 22 and the corrector 23 may be a hardware such as a dedicated circuit or the like.

The laser 11 is a light source such as a semiconductor laser. The laser 11 emits a laser light of a predetermined wavelength range in accordance with an instruction of the indicator 21. In the embodiment, the laser 11 emits an optical pulse (laser pulse) at a predetermined time interval. The beam splitter 12 inputs an optical pulse emitted by the laser 11 into the optical switch 13. The optical switch 13 switches destinations of the optical pulse. The optical switch 13 alternately inputs an optical pulse into a first end and into a second end of the optical fiber 30 at a predetermined cycle in accordance with an instruction of the indicator 21. In the embodiment, a length of the optical fiber 30 is L meter (m). A position of the first end is 0 meter (m). A position of the second end is L meter (m).

The optical pulse input into the optical fiber 30 propagates in the optical fiber 30. The optical pulse generates a forward-scattering light progressing toward a propagation direction and a back-scattering light progressing toward a return direction (returning light), gradually attenuates, and propagates in the optical fiber 30. The back-scattering light passes through the optical switch 13 and is input into the beam splitter 12 again. The back-scattering light input into the beam splitter 12 is emitted toward the filter 14. The filter 14 is a WDM coupler or the like, and extracts a long wavelength component (Stokes component described later) and a short wavelength component (anti-Stokes component) from the back-scattering light. The detectors 15a and 15b are a photo diode. The detector 15a converts light intensity of the short wavelength component of the back-scattering light into an electrical signal and transmits the electrical signal to the temperature measurer 22 and the corrector 23. The detector 15b converts light intensity of the long wavelength component of the back-scattering light into an electrical signal, and transmits the electrical signal into the temperature measurer 22 and the corrector 23. The corrector 23 corrects the Stokes component and the anti-Stokes component. The temperature measurer 22 uses the Stokes component and the anti-Stokes component and measures a temperature.

Figure 2:
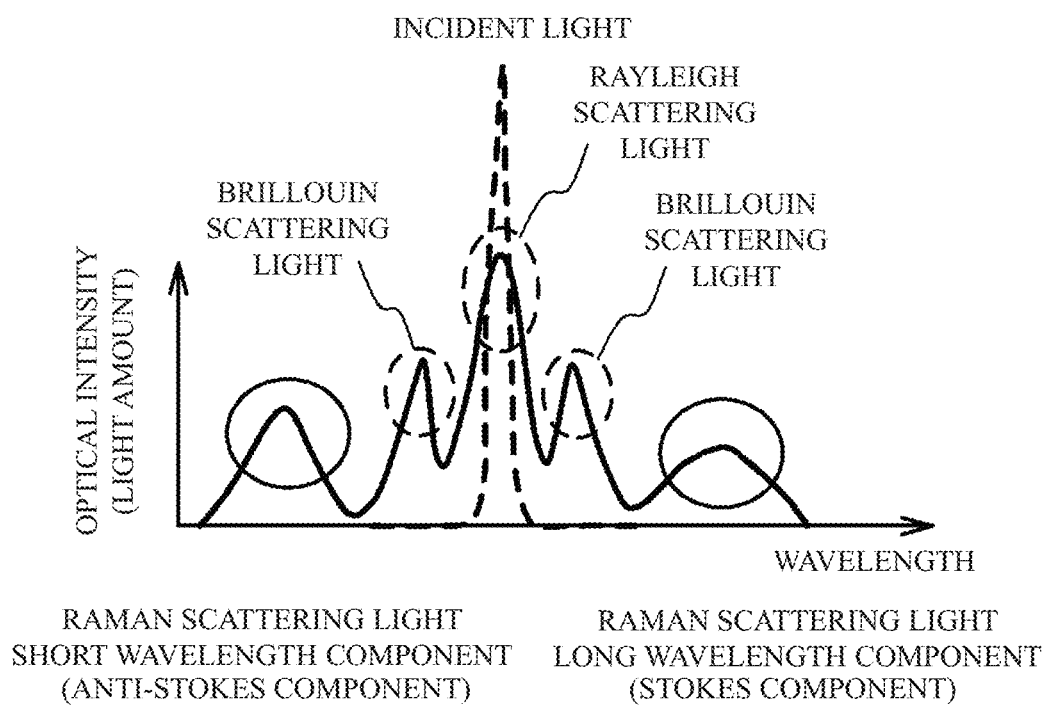
FIG. 2 illustrates components of a back-scattering light.

FIG. 2 illustrates components of the back-scattering light. As illustrated in FIG. 2, the back-scattering light is roughly classified into three types. The three types of light are a Rayleigh scattering light used for an OTDR (Optical Time Domain Reflectometer), a Brillouin scattering light used for distortion measurement, and a Raman scattering light used for temperature measurement, in descending order according to optical intensity and in short-distance order with respect to the input optical wavelength. The Rama scattering light is generated by interference between a lattice oscillation and a light changing according to a temperature in the optical fiber 30. A short wavelength component called anti-Stokes component is generated by intensified interference. A long wavelength component called Stokes component is generated by weakened interference.

Figure 3A:
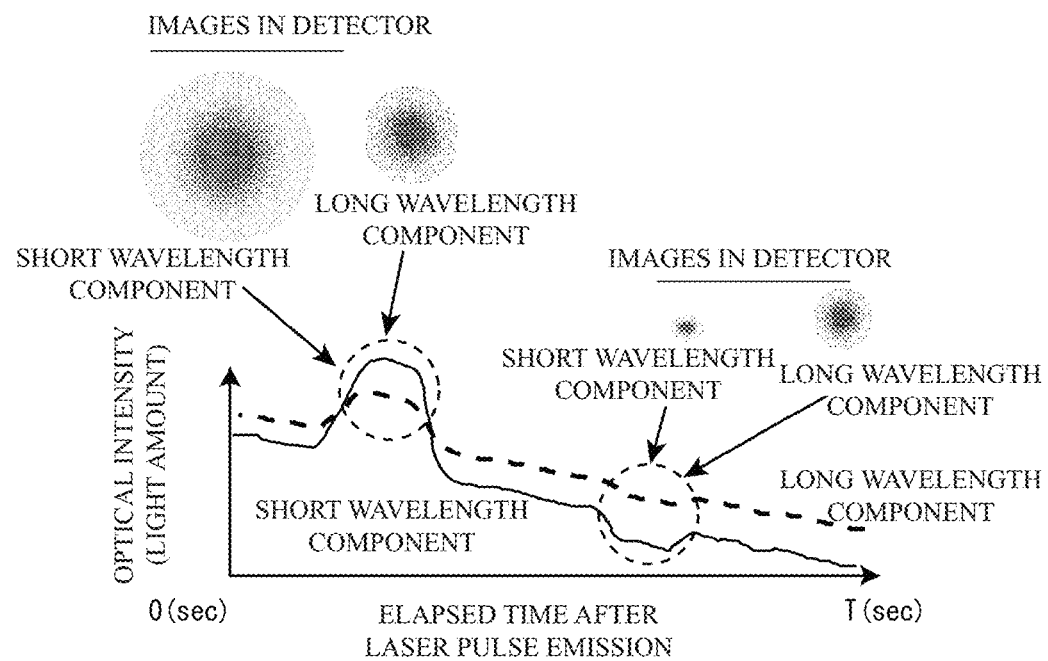
FIG. 3A illustrates a relationship between an elapsed time after optical pulse emission by a laser and optical intensities of a Stokes component and an anti-Stokes component.

FIG. 3A illustrates a relationship between an elapsed time after optical pulse emission by the laser 11 and optical intensities of the Stokes component (long wavelength component) and the anti-Stokes component (short wavelength component). The elapsed time corresponds to a propagation distance of the optical fiber 30 (a position in the optical fiber 30). As illustrated in FIG. 3A, the optical intensities of the Stokes component and the anti-Stokes component are gradually reduced as time passes. This is because the optical pulse propagates in the optical fiber 30 and is gradually reduced with generation of the forward scattering light and the back-scattering light.

As illustrated in FIG. 3A, the optical intensity of the anti-Stokes component is stronger than that of the Stokes component at a position where a temperature of the optical fiber 30 is relatively higher. The optical intensity of the anti-Stokes component is weaker than that of the Stokes component at a position where the temperature is relatively lower. It is therefore possible to detect a temperature of each position of the optical fiber 30 when the detectors 15a and 15b detect the both components and a difference of characteristic of the both components is used. A region of a local maximum in FIG. 3A is a part of the optical fiber 30 that is intentionally heated by a drier or the like in FIG. 1A. A region of a local minimum is a part of the optical fiber 30 that is intentionally cooled by cold water or the like in FIG. 1A.

In the embodiment, the temperature measurer 22 measures a temperature with respect to each elapsed time from the Stokes component and the anti-Stokes component. Thus, it is possible to measure a temperature of each position of the optical fiber 30. The temperature measurer 22 measures the temperature of each position of the optical fiber 30 by calculating the temperature in accordance with the following formula (1). A light amount corresponds to an optical intensity. When a ratio of the two components is used, a difference between the two weak components is enhanced. And, a practical value can be obtained. A gain and an offset depend on a design of the optical fiber 30. Therefore, the gain and the offset are calibrated in advance.

$$\text{Temperature} = \text{gain}/\{\text{offset} - 2 \times \ln(\text{an anti-Stokes light amount/a Stokes light amount})\} \quad (1)$$

Figure 3B:
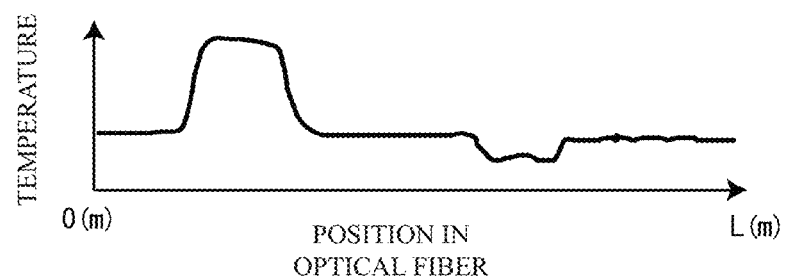
FIG. 3B illustrates a temperature calculated with use of a detection result of FIG. 3A and a formula (1)

FIG. 3B illustrates a temperature calculated with use of a detection result of FIG. 3A and the above-mentioned formula (1). A horizontal axis of FIG. 3B is a position of the optical fiber 30 calculated on the basis of the elapsed time. As illustrated in FIG. 3B, when the Stokes component and the anti-Stokes component are detected, the temperature of each position of the optical fiber 30 can be measured. The laser 11 emits an optical pulse into the optical fiber 30 at a constant cycle. A spatial resolution increases as a pulse width of the optical pulse becomes narrower. On the other hand, the light amount becomes smaller (darker) as the pulse width gets narrower. It is necessary to enlarge a peak level of the pulse for that. The response is changed so that the gain in the above-mentioned formula becomes non-linear.

When an incident position to the optical fiber 30 from the optical switch 13 is fixed to one of the first end and the second end, the temperature measurement with use of the above-mentioned formula (1) can be achieved. When the incident position is alternately switched to the first end and the second end at a constant cycle as in the case of the embodiment, the anti-Stokes light amount and the Stokes light amount are averaged with respect to the position of the optical fiber 30 (calculation of an average). The switching method is called a loop type measurement, a double end measurement or a dual end measurement.

Figure 4:
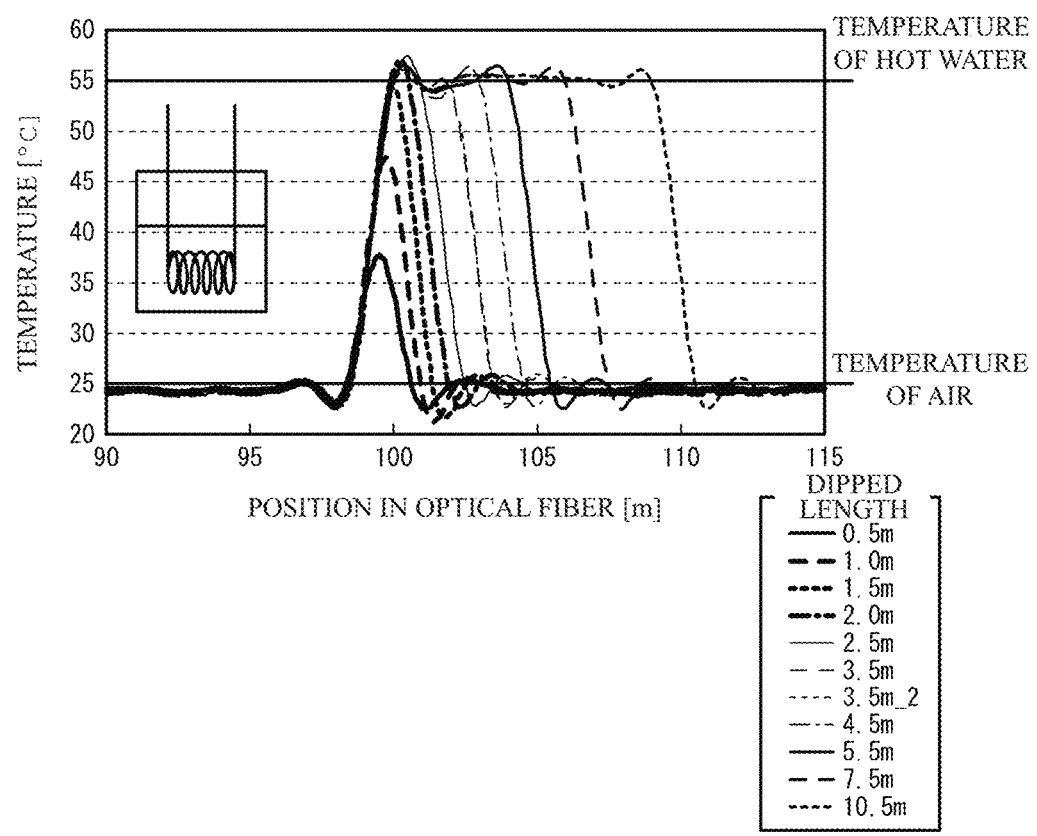
FIG. 4 illustrates a response example of a case where a part of an optical fiber is dipped in hot water of approximately 55 degrees C. when a room temperature is approximately 24 degrees C.

Next, a relationship between a section length of a temperature measurement object in the optical fiber and a measured temperature obtained from the Raman scattering light. FIG. 4 illustrates a response example of a case where a part of the optical fiber 30 is dipped in hot water of approximately 55 degrees C. when a room temperature is approximately 24 degrees C. When the length dipped in the hot water is elongated from 0.5 m to 10.5 m, a peak temperature becomes 55 degrees C. that is the same as that of the hot water in a case where the dipped length is 2 meters or more. It is therefore preferable that the section of the temperature measurement object is elongated in order to measure the precise temperature.

When a temperature obtained by subtracting a precise room temperature from a precise hot water temperature is applied to the optical fiber 30, a sensitivity of the measurement system can be expressed by the following formula (2).

$$\text{Sensitivity} = (\text{a peak temperature of a position dipped in the hot water} - \text{a room temperature measured with use of the optical fiber before and after the dipped position})/\text{applied temperature} \times 100(\%) \quad (2)$$

Figure 5:
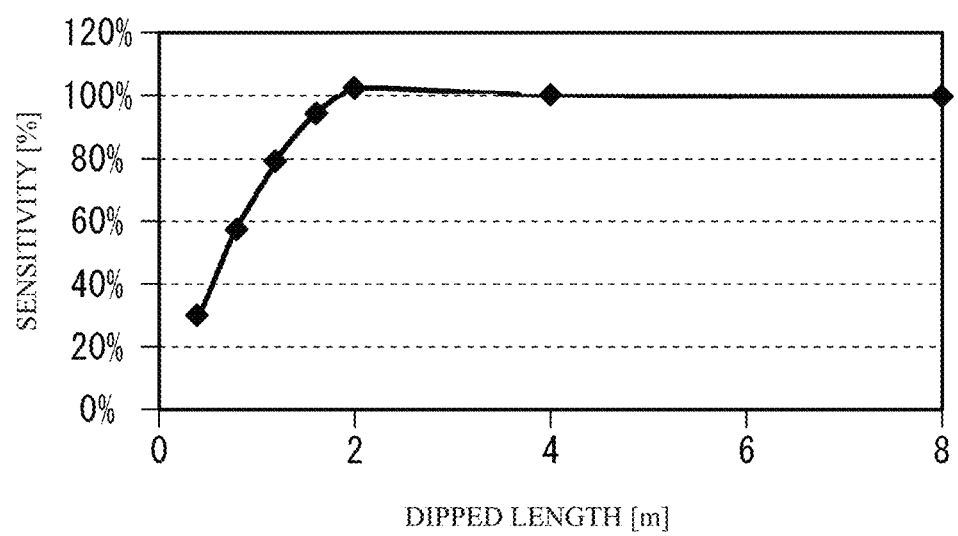
FIG. 5 illustrates results obtained from FIG. 4 and a formula (2)

FIG. 5 illustrates results obtained from FIG. 4 and the above-mentioned formula (2). As illustrated in FIG. 5, a slight overshoot appears. This is because the impulse response of the system is not a Gausian type but the impulse response has a wave form having a minus component closer to sinc function and a high order peak. A minimum length of which sensitivity is 100% or is considered as 100% is called a minimum heated length.

Figure 6:
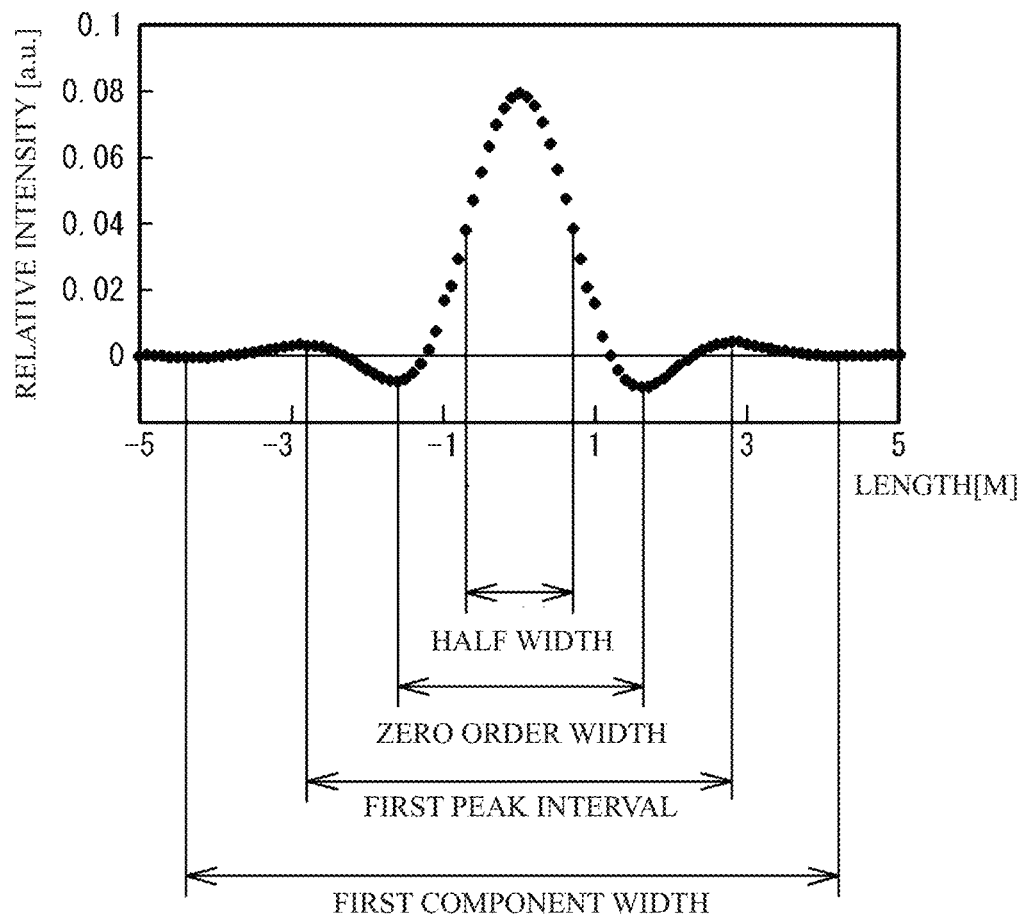
FIG. 6 illustrates a typical example of an impulse response.

From FIG. 4, the temperature in a case where a higher-temperature-applied section (section dipped in hot water) is provided in a constant temperature region may be considered as equivalent to a single square wave to which an impulse response is convolved. Thus, the impulse response of the system is determined. FIG. 6 illustrates a typical example of the calculated impulse response. In the temperature measurement of an optical fiber with use of a back Raman scattering light, as illustrated in FIG. 6, the impulse response may be considered as a wave form in which a window function is applied to a sinc function so that a distance away from a center is smoothly attenuated. The overshoot of the sensitivity curve of FIG. 5 occurs because of the impulse response wave form. When the impulse response is convoluted into applied temperature distribution along the longitudinal direction of the optical fiber 30, it is possible to achieve approximately precise output prediction.

Figure 7A:
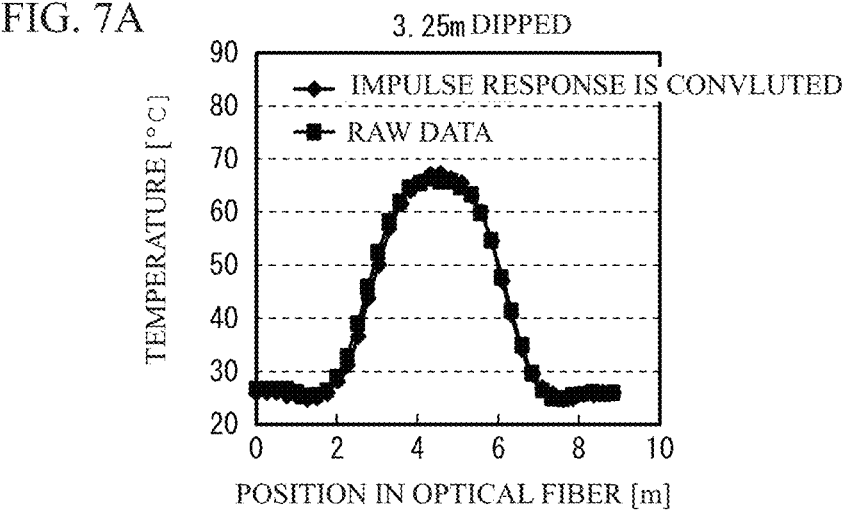
FIG. 7A to FIG. 7C illustrate a comparison between an output wave form that is estimated from an impulse response with respect to each dipped length and an output wave form that is actually obtained.
Figure 7B:
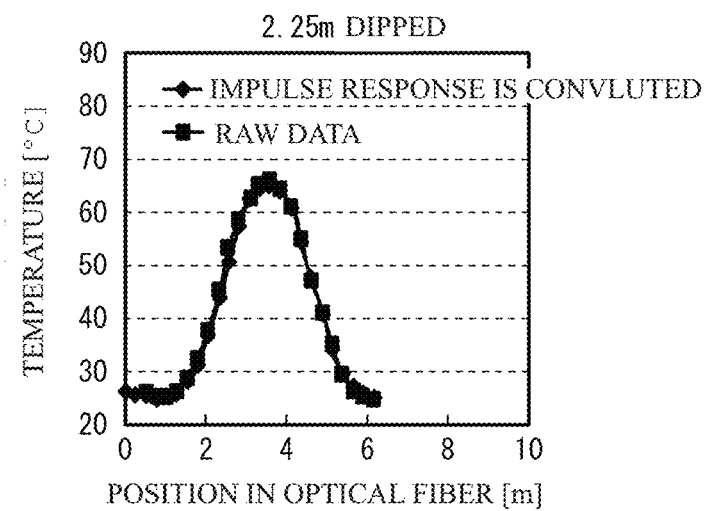
Figure 7C:
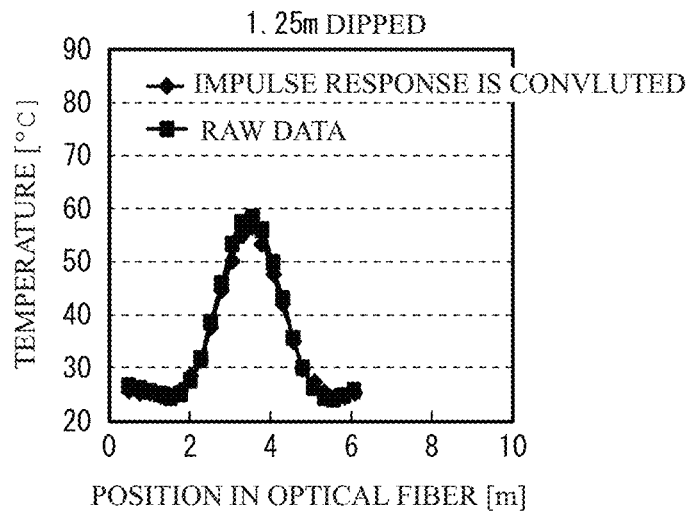

FIG. 7A to FIG. 7C illustrate a comparison between the output wave form that is estimated from the impulse response with respect to each dipped length in the hot water and the output wave form that is actually obtained. As illustrated in FIG. 7A to FIG. 7C, the output wave form can be approximately precisely predicted. When the dipped length in the hot water is 3.25 m as illustrated in FIG. 7A, a peaks is smoothed because convolutions of the impulse responses interfere with each other.

Figure 8:
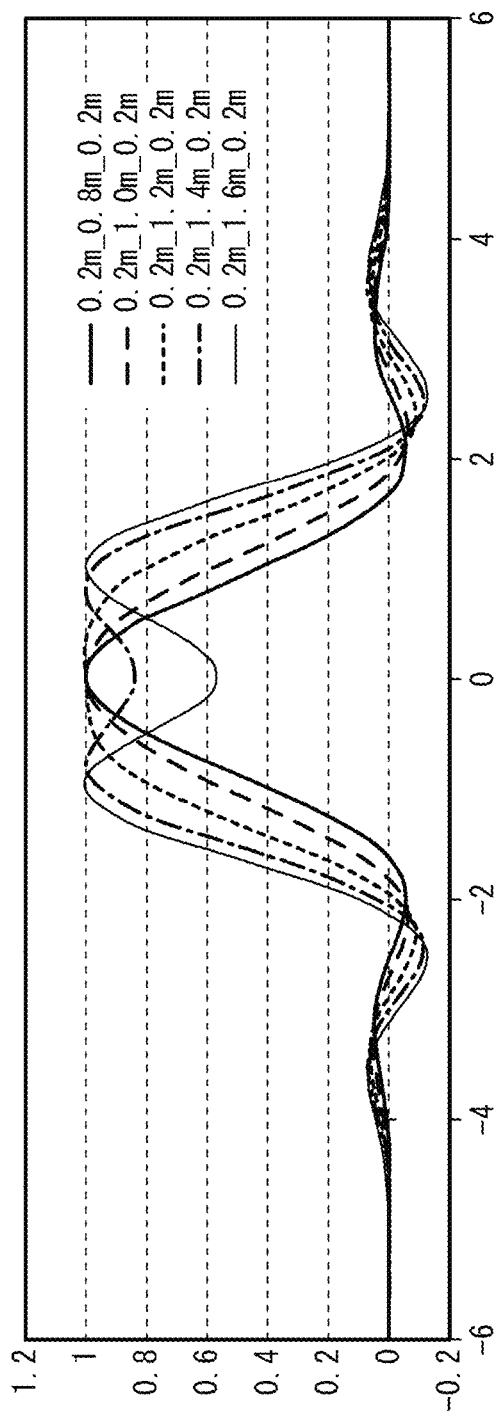
FIG. 8 illustrates a calculated values of output wave forms in a case where a center section to which a high temperature is not applied is provided between two high-temperature-applied sections of 20 cm, and a width of the center section is gradually changed.

And so, FIG. 8 illustrates a calculated values of output wave forms in a case where a center section to which a high temperature is not applied is provided between two high-temperature-applied sections of 20 cm (that is, the center section is exposed to air without dipping in the hot water), and a width of the center section is gradually changed. A peak temperature is normalized into 1. And a reference temperature is normalized into 0. As illustrated in FIG. 8, it may be considered that there are two high-temperature-applied sections when a length of the center section is 1.2 meters to 1.4 meters. This is because interference caused by the enlargement of the impulse response wave form occurs as illustrated in FIG. 6. It is possible to consider that there are two high-temperature-applied sections when a distance between the two high-temperature-applied sections is a half-value width of the impulse response of FIG. 8 or more. It is preferable that the distance is equal to a half value of a zero order component width at which a gradient is reversed or more, in order to determine that the two sections are apparently spaced from each other. That is, from FIG. 8, the distance between the two high-temperature-applied sections is larger than a width of primary peaks and is approximately equal to the primary component width, when a minimum temperature of the center non-heated section is equal to the reference temperature, that is, the interference of the impulse response wave forms can be ignored in FIG. 8.

In order to determine that a temperature changed because of a function of a transfer function a currently focused position of the optical fiber, that is, a temperature is precisely output, it is preferable to focus on a temperature changing of a range of which a center position is the currently focused position and of which a width is equal to a zero order component width or more and a primary component width or less. The optical pulse propagates while gradually spreading and gradually attenuating because of influence such as a widening of a wavelength, an incident angle of view, scattering or the like. It is therefore preferable that the impulse response is measured or calculated at a center position when an optical fiber having a maximum usage length listed in specifications of the optical fiber 30 is connected. Alternatively, it is preferable that values of a near end, a center and a far end are averaged.

In order to measure the temperature with higher accuracy, it is preferable that a plurality of sections are determined so that ranges that are difference ranges between the convolution and the output data illustrated in FIG. 7A to FIG. 7C are not problems are considered as the same, the impulse response is measured or calculated at a center position of each section and is stored, and each impulse response stored with respect to each section is used. With passage of time, the impulse response wave form slightly changes because of degradation of the laser or the like. It is therefore preferable that, in a constant cycle, the impulse response is calibrated at the same position as an initially obtained position in order to measure the temperature with higher accuracy.

Figure 9:
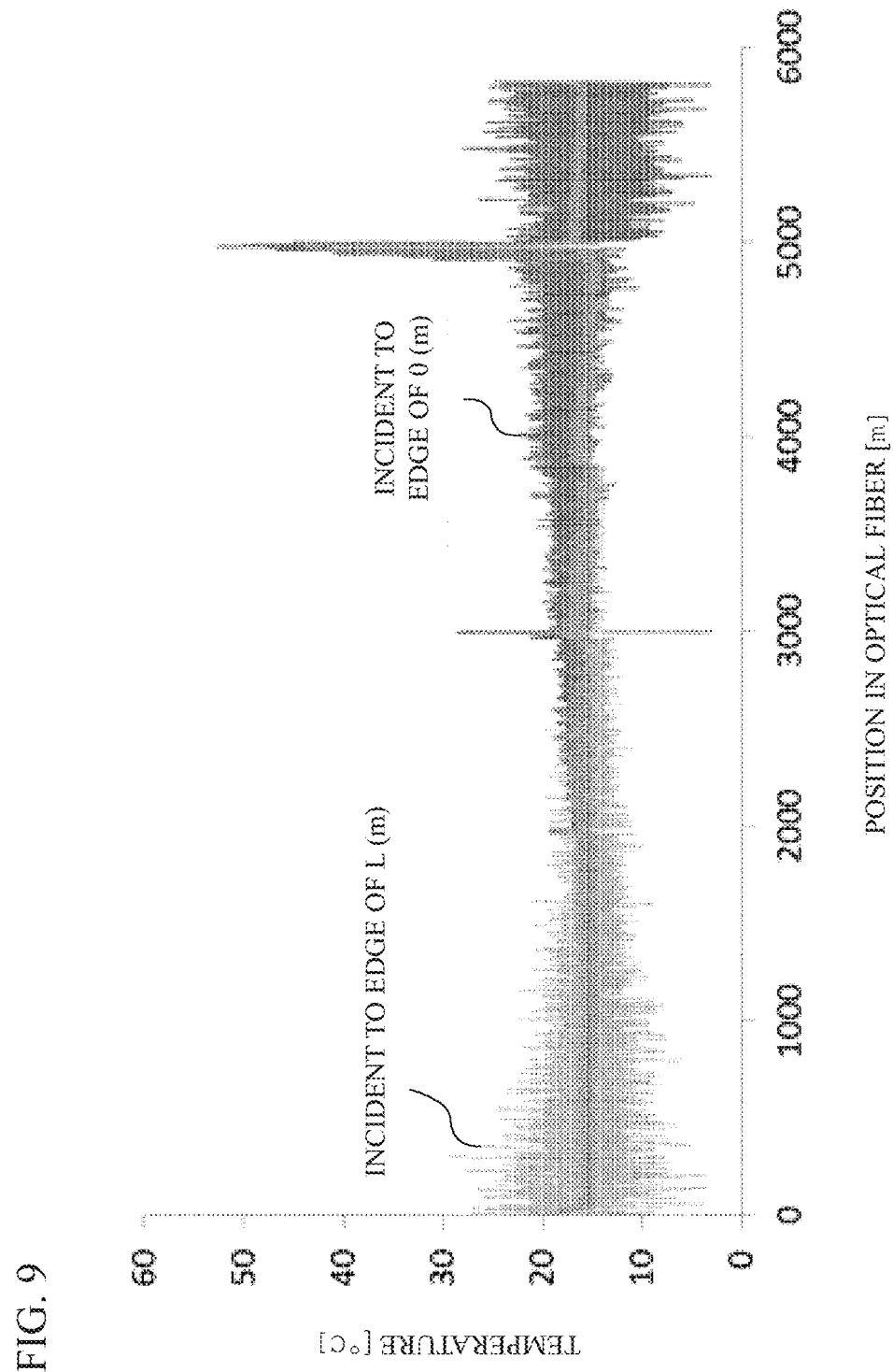
FIG. 9 illustrates an example of temperature distribution measured by detecting a back Raman scattering light in a case where a pulse is input into one end.

FIG. 9 illustrates an example of temperature distribution measured by detecting a back Raman scattering light in a case where the pulse is input into one end. In FIG. 9, a waveform in a case where the pulse is input into the first end (0 meter) illustrated in FIG. 1 and a waveform in a case where the pulse is input into the second end (L meter) illustrated in FIG. 1 are overlapped. When the pulse is input into the first end, variability of the measured temperature is small near the first end. The variability of the measured temperature becomes larger toward the second end. On the other hand, when the pulse is input into the second end, the variability of the measured temperature is small near the second end. The variability of the measured temperature becomes larger toward the first end. A connection position of a connector not cleaned sufficiently is 3000 m or around where the temperature changing is large. The position dipped in the hot water is 4900 m or around. In the example, a path is structured by rolling a plurality of bobbins around the optical fiber 30. Average temperatures of the plurality of bobbins are slightly different from each other. Therefore, a plurality of differences of level occur. In FIG. 9, the variability becomes larger and the measurement accuracy becomes worse when being away from the light source.

Figure 10:
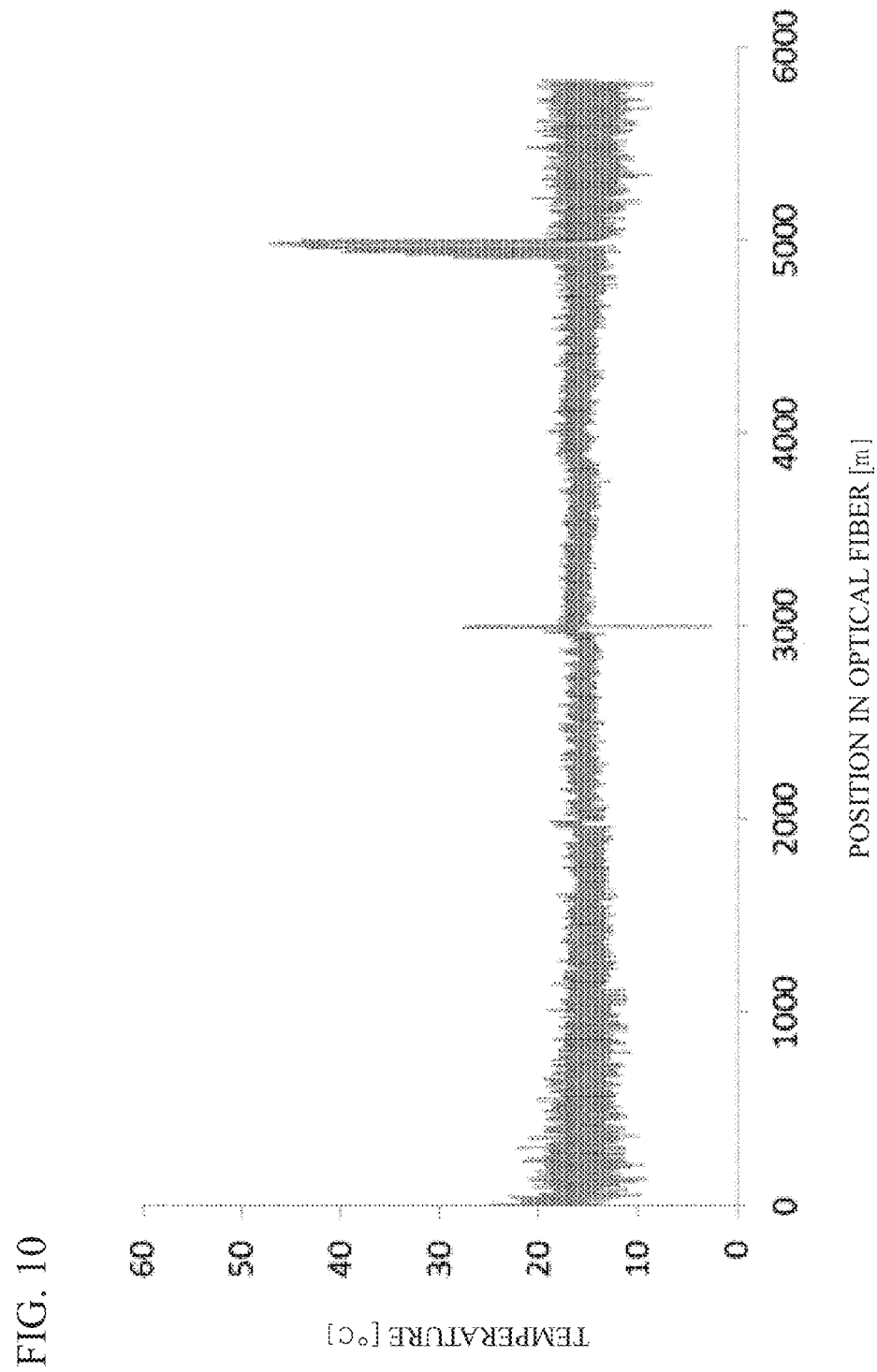
FIG. 10 illustrates a calculated temperature obtained by averaging Stokes components and anti-Stokes components of two signals input from both ends of FIG. 9.

FIG. 10 illustrates a calculated temperature obtained by averaging the Stokes components and the anti-Stokes components of the two signals input from both ends of FIG. 9 and is an example of what is called a double end method or a dual end method. By the averaging, the degradation of the measurement accuracy of the end points is suppressed, compared to FIG. 9. However, the measurement accuracy is lower than the preferable end point. FIG. 11 quantitatively illustrates the measured temperature. The measurement accuracy is a value of a standard deviation $3\sigma$ that is calculated with use of values of three points of 100 m of a terrace in which the temperature does not change. It is confirmed that an average (loop method) is an average value of a value of the case where the pulse is input into the 0 m and the value of the case where the pulses is input into L (m).

The temperature measurement using the detection of the back Raman scattering light of an optical fiber is used for detection of fire abnormality of a tunnel, a coal belt conveyor or the like. In the fire detection, accuracy of ±6 degrees C. is not a problem. However, when accuracy of ±1 degrees C. is needed, the accuracy is achieved by 36 $(6/1)^2$ times of the measurement time. For example, it takes 12 minutes for a device capable of achieving the measurement accuracy of FIG. 13 by 20 seconds to achieve the accuracy of ±1 degrees C. It takes 36 minutes for the device capable of achieving the measurement accuracy of FIG. 12 by one minute to achieve the accuracy of ±1 degrees C. The time does not correspond to a real time. Therefore, the usage is limited. It is preferable that the measurement accuracy is improved by post processes without expensive light sources, expensive filters, expensive circuits or the like, in order to use the measurement in a wider field.

Figure 12:
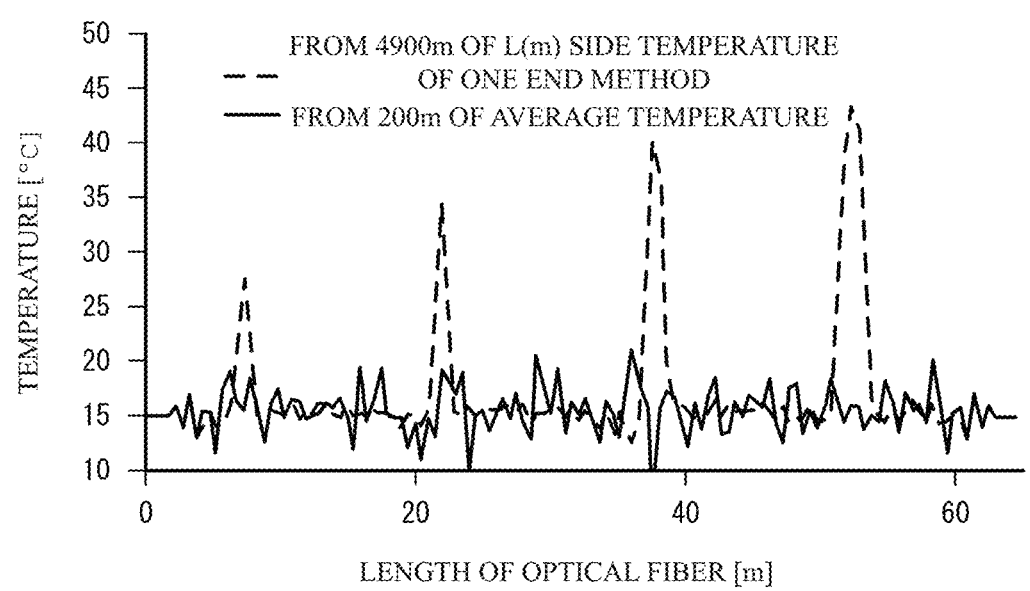
FIG. 12 illustrates an overlapped view of temperature distribution of a section that is extracted from FIG. 9, is on an L meter side of which noise is fewer and is dipped in hot water, and a terrace temperature range that is extracted from FIG. 10 and is near 200 meters.

A band pass filter that cuts off an unnecessary lower signal band, an unnecessary higher signal band (and an unnecessary middle band) or an adaptive filter that extracts an effective signal band on the basis of a designed noise model may be applied as post processes for noise reduction. FIG. 12 illustrates an overlapped view of temperature distribution of a section that is extracted from FIG. 9, is on the L meter side of which noise is fewer and is dipped in the hot water, and a terrace temperature range that is extracted from FIG. 10 and is near 200 meters. A fluctuation of the temperature of the terrace temperature range is caused by the noise.

Figure 13:
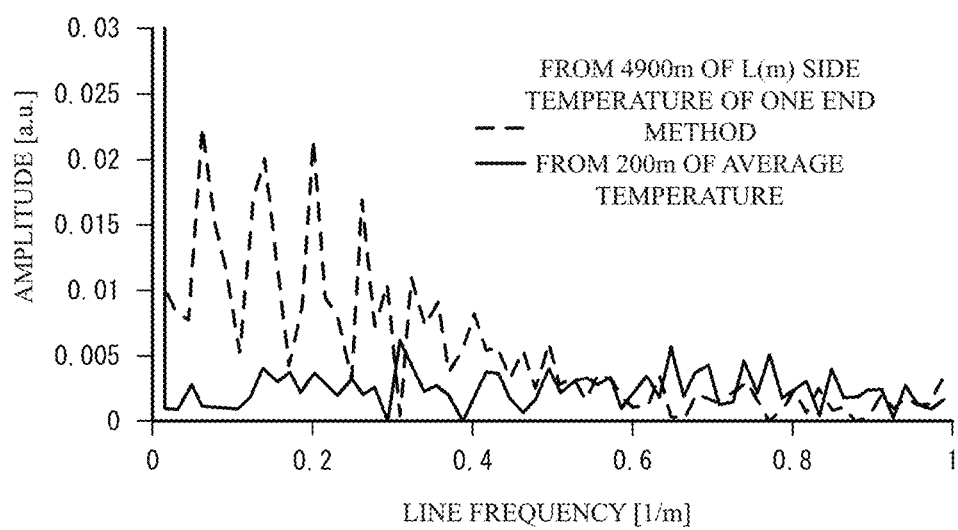
FIG. 13 illustrates a power spectrum of two wave forms.

In these data, both sides of a signal are attenuated in order to minimize an influence of aliasing at an FFT (Fast Fourier Transform). The wave form is non-linear because a sampling interval is approximately 50 cm. FIG. 13 illustrates a power spectrum of these two wave forms. As illustrated in FIG. 13, a band of a noise is overlapped with a band of a signal component. That is, a signal component attenuates with suppression of a noise in any filter processes. It is possible to preferably reduce the noise when the temperature of the hot water and the dipped length are known. However, a pattern of temperature distribution given to the optical fiber is not determined in advance. Accordingly, there is a tradeoff problem with respect to the noise reduction, in a temperature measurement method using detection of a back Raman scattering light of an optical fiber.

Figure 14A:
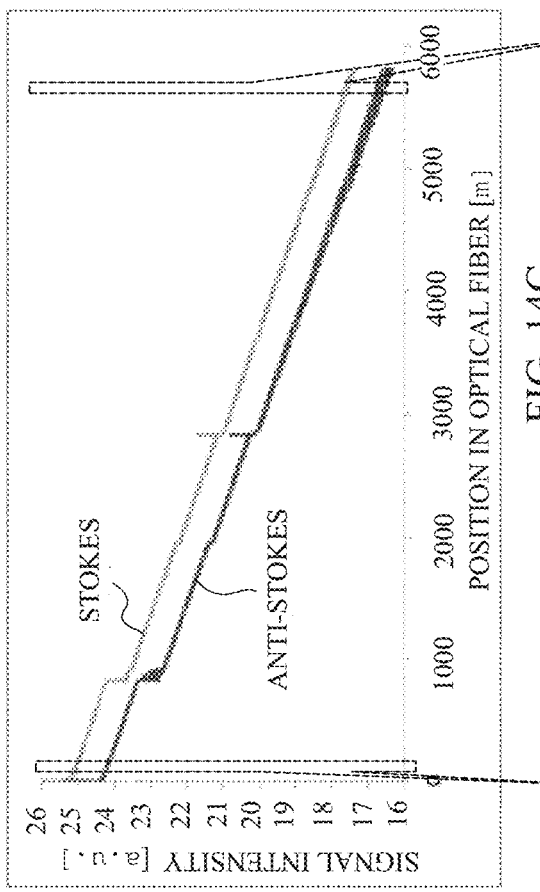
FIG. 14A to FIG. 14C illustrate a Stokes component and an anti-Stokes component that are original signals for calculating temperature distribution illustrated in FIG. 9.
Figure 14C:
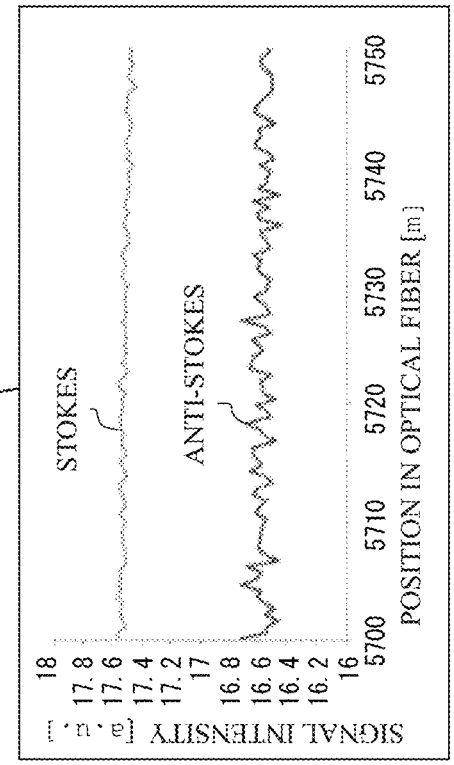
Figure 14B:
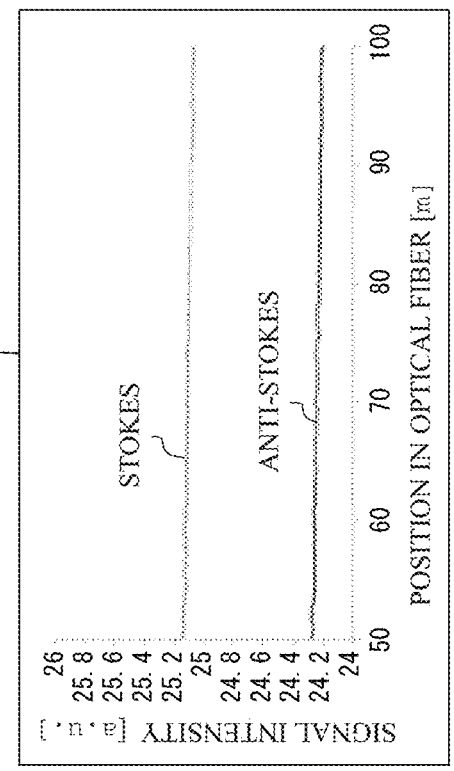

FIG. 14A to FIG. 14C illustrate a Stokes component and an anti-Stokes component that are original signals for calculating the temperature distribution illustrated in FIG. 9. In the above-mentioned formula (1), two light amounts in ln( ) are caused by a noise of a temperature. In FIG. 14A to FIG. 14C, on an incident end side of the optical fiber 30, a noise is small in both of the Stokes component and the anti-Stokes component. At an output end, the noise of the anti-Stokes component is specifically large. That is, it is preferable that a method for reducing the noise of the anti-Stokes component at the output end is focused in order to reduce the noise.

Figure 15:
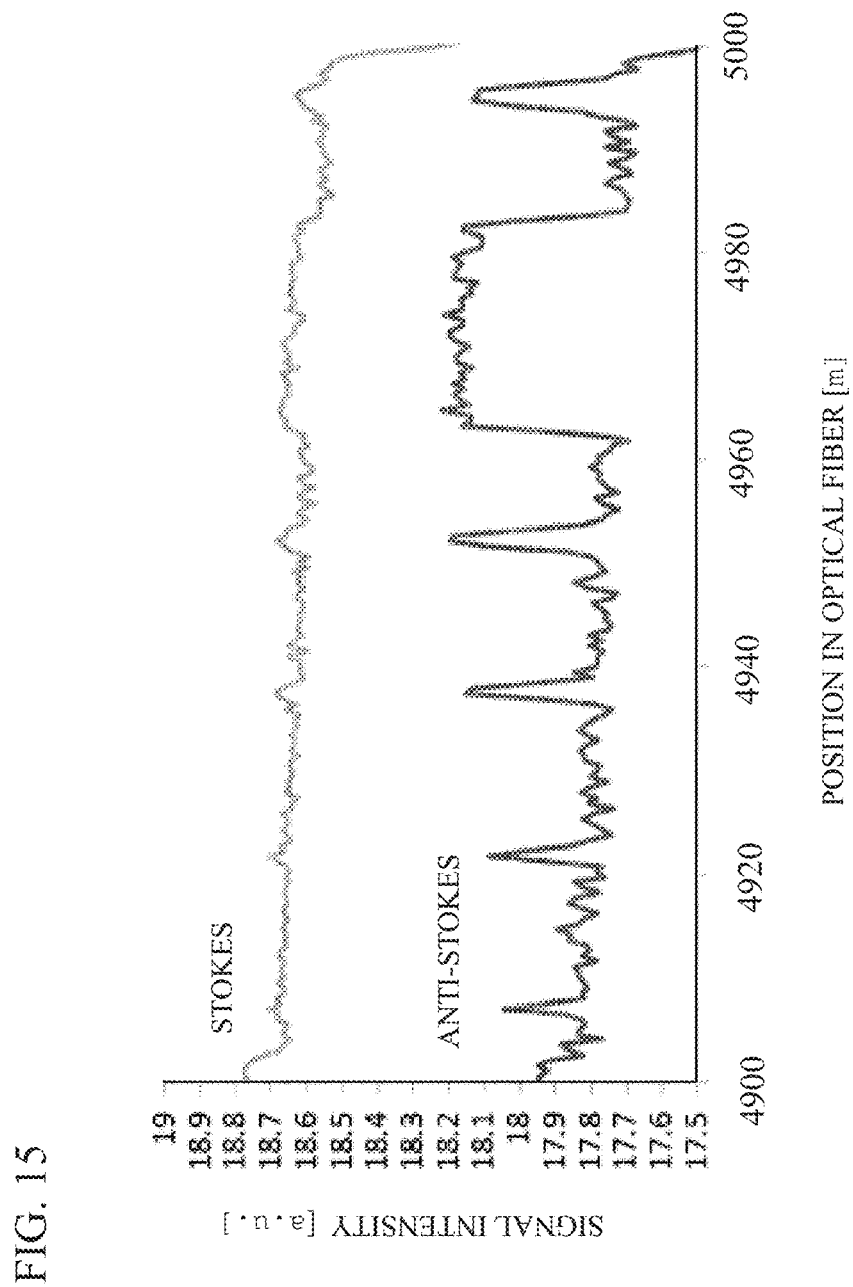
FIG. 15 illustrates a Stokes component and an anti-Stokes component of a position dipped in hot water in a case where an optical pulse is input into one end on zero meter side.

And so, it is thought that a changing of the Stokes component and a changing of the anti-Stokes component are focused. FIG. 15 illustrates the Stokes component and the anti-Stokes component of the position dipped in the hot water in a case where an optical pulse is input into one end on the zero meter side. As illustrated in FIG. 15, both signals indicate a changing at a position where a temperature changes, and attenuate with optical propagation at other positions. When a temperature changes, the Stokes component and the anti-Stokes component also change in synchronization with the temperature changing in the longitudinal direction of the optical fiber 30. That is, when the synchronization range is specified, it is thought that a temperature of other ranges does not change with respect to another next position of the optical fiber on a light source side or only a temperature gradient smoothly changes.

And so, it is possible to focus on the minimum heated length described on the basis of FIG. 6 to FIG. 8. It may be considered that the temperature measurement by the detection of the back Raman scattering light indicates approximately the same minimum heated length response in a given section. When a part of the optical fiber of the minimum heated length is heated more than the region in which the temperature is kept constant, a wave form that is approximately the same as the impulse response of FIG. 6 is achieved. As mentioned above, it is preferable to focus on a range of which a width is equal to or more than a zero order component width at which a gradient is reversed and is equal to or less than a primary component width at which amplitude is approximately attenuated to zero, as a range (interference range) having an influence on circumferences.

Figure 16:
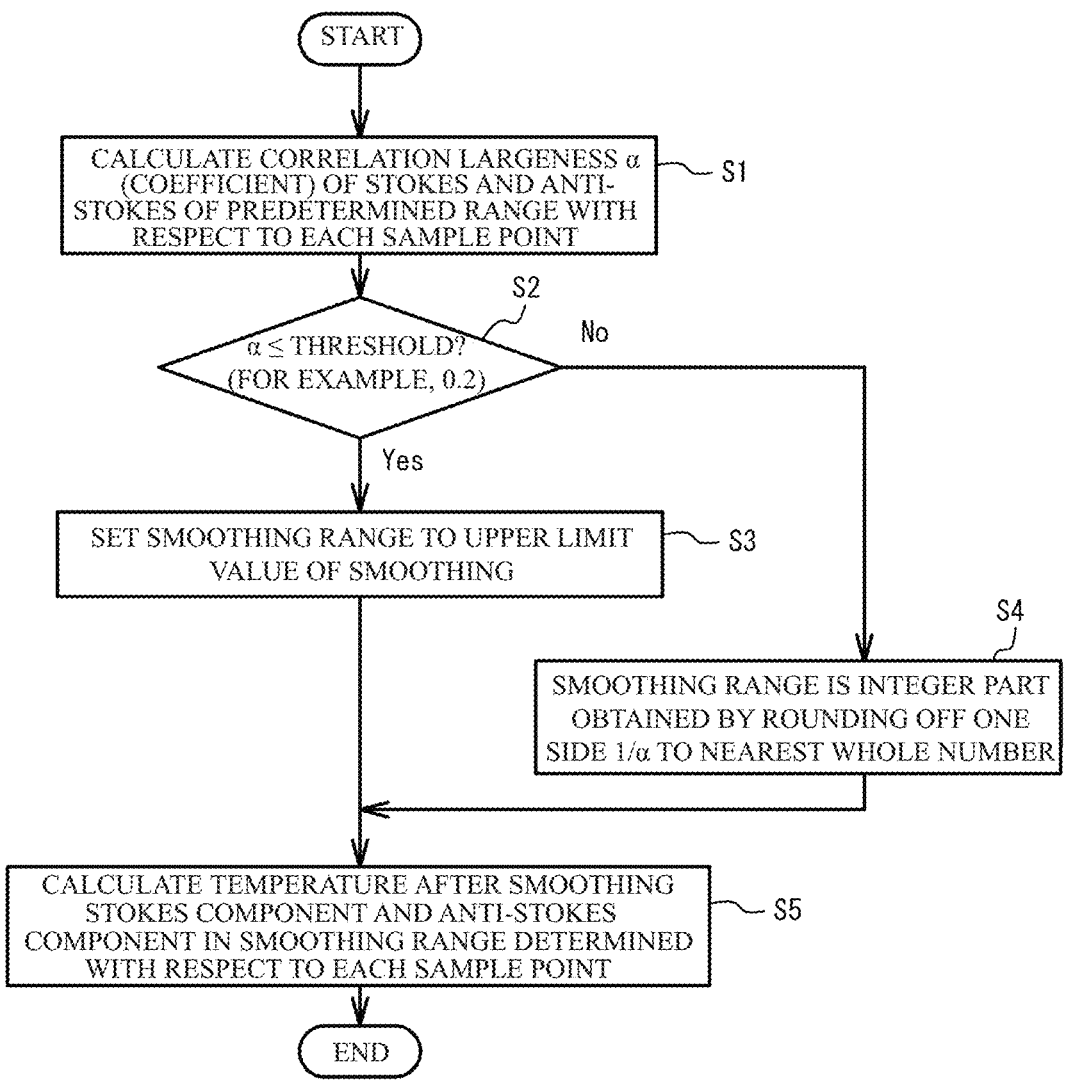
FIG. 16 illustrates a flowchart executed when a corrector corrects a temperature measured by a temperature measurer.

FIG. 16 illustrates a flowchart executed when the temperature measurement device 100 measures a temperature. The corrector 23 calculates a largeness a of correlation of the Stokes component and the anti-Stokes component of a predetermined range (designated range) including the sample point and having a width that is equal to or more than zero order component width of the minimum heated length response waveform and equal to or less than a primary component width, with respect to each sample point (Step S1). The sample point is a temperature measurement object in the longitudinal direction of the optical fiber 30.

There are many methods for determining the largeness of the correlation. For example, it is possible to use Pearson's product-moment correlation coefficient. The Pearson's product-moment correlation coefficient is expressed by the following formula (3).

Correlation coefficient α=(covariance of the anti-Stokes component of which a range is the same as that of the Stokes component of a designated range)/(standard deviation of the Stokes component of the same range)/(standard deviation of the anti-Stokes component of the same range)    (3)

The Pearson's product-moment correlation coefficient of which a center is a sample point k of the optical fiber 30 is α[k]. An array of the Stokes component is STK[k]. An array of the anti-Stokes component is ASTK[k]. The number of the samples of the designated range is n. An average of STK[k] of the designated range is STKave. An average of ASTK[k] of the designated range is ASTKave. The above-mentioned formula (3) can be expressed by the following formula (4).

$$\alpha[k] = \frac{n^{-1}\sum_{k=0}^{n}(STK[k]-STKave)(ASTK[k]-ASTKave)}{\sqrt{n^{-1}\sum_{k=0}^{n}(STK[k]-STKave)^2}\sqrt{n^{-1}\sum_{k=0}^{n}(ASTK[k]-ASTKave)^2}} \quad (4)$$

As another example, when a modified Spearman's rank correlation coefficient is used, the n numbers of the Stokes component and the anti-Stokes component in the designated range (n in the above-mentioned formula (4)) are ranked and the Pearson's product-moment correlation coefficient is used for the ranking. When there are two or more of the same rank, a compensation formula is used. However, generally, there are few cases where there are two or more of the same rank, with respect to the Stokes component and the anti-Stokes component. Therefore, the previously appearing one may be treated as a higher rank.

Figure 17:
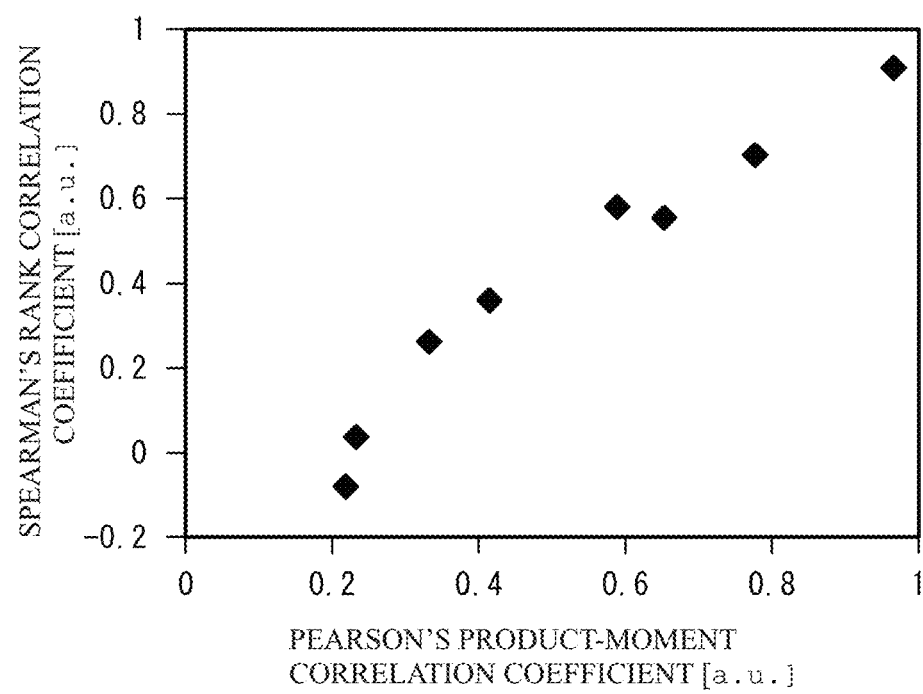
FIG. 17 illustrates a comparison between a Pearson's product-moment correlation coefficient and a Spearman's rank correlation coefficient.

For example, ±3.6 m is set in the section indicated by the impulse response of FIG. 6, as a range satisfying the above condition. FIG. 17 illustrates a comparison between the Pearson's product-moment correlation coefficient and the Spearman's rank correlation coefficient with respect to the data of FIG. 9 to FIG. 14C. Generally, the Pearson's product-moment correlation coefficient of 1 or −1 indicates a complete correlation. The Pearson's product-moment correlation coefficient of 0.4 or more and less than 0.7 in an absolute value indicates a high correlation. The Pearson's product-moment correlation coefficient of 0.2 or more and less than 0.4 in an absolute value indicates a low correlation. The Pearson's product-moment correlation coefficient of less than 0.2 in an absolute value indicates no correlation. However, although an inclination of Spearman's is changed greatly than that of Pearson's, in the range of less than 0.2 indicating no correlation, an approximate ratio of 1:1 is achieved in the range of 0.3 or more indicating the low correlation and the same result is achieved with respect to FIG. 16. When normalized, another correlation coefficient may be generated. Of course, another correlation coefficient may be used.

On the basis of FIG. 16 again, the corrector 23 determines whether the correlation coefficient α is equal to or less than a threshold (for example, 0.2 or less) (Step S2). When it is determined as "Yes" in Step S2, the corrector 23 enlarges a smoothing range of a focused sample point to an upper limit of the smoothing range (Step S3). The upper limit of the smoothing range may be totally 11 samples including 6 samples of one side with respect to the sample point. When it is determined as "No" in Step S2, the corrector 23 uses an integer number of sample as the smoothing range with respect to one side (Step S4). The integer number is obtained by rounding off 1/α to the nearest whole number. The temperature measurer 22 uses the corrected Stokes component and the corrected anti-Stokes component corrected by the corrector 23 and calculates a temperature of the sample point (Step S5). When the correlation coefficient α is 1 or close to 1, the smoothing range is 1 and the smoothing is not performed.

The smoothing process is a process for suppressing variability of data in a predetermined range. In the embodiment, an average of data in an obtained smoothing range is calculated. However, another average such as an arithmetic mean considering a weight, a geometric mean or a harmonic mean may be used.

In FIG. 16, a reciprocal number of the largeness of the correlation coefficient is an index of the smoothing range. However, it is not always necessary to use the reciprocal number. The larger the correlation coefficient is, the narrower the smoothing range relatively is. And, the smaller the correlation coefficient is, the wider the smoothing range relatively is. When the correlation coefficient becomes further smaller, the smoothing range is maintained at a predetermined upper limit value.

Figure 18:
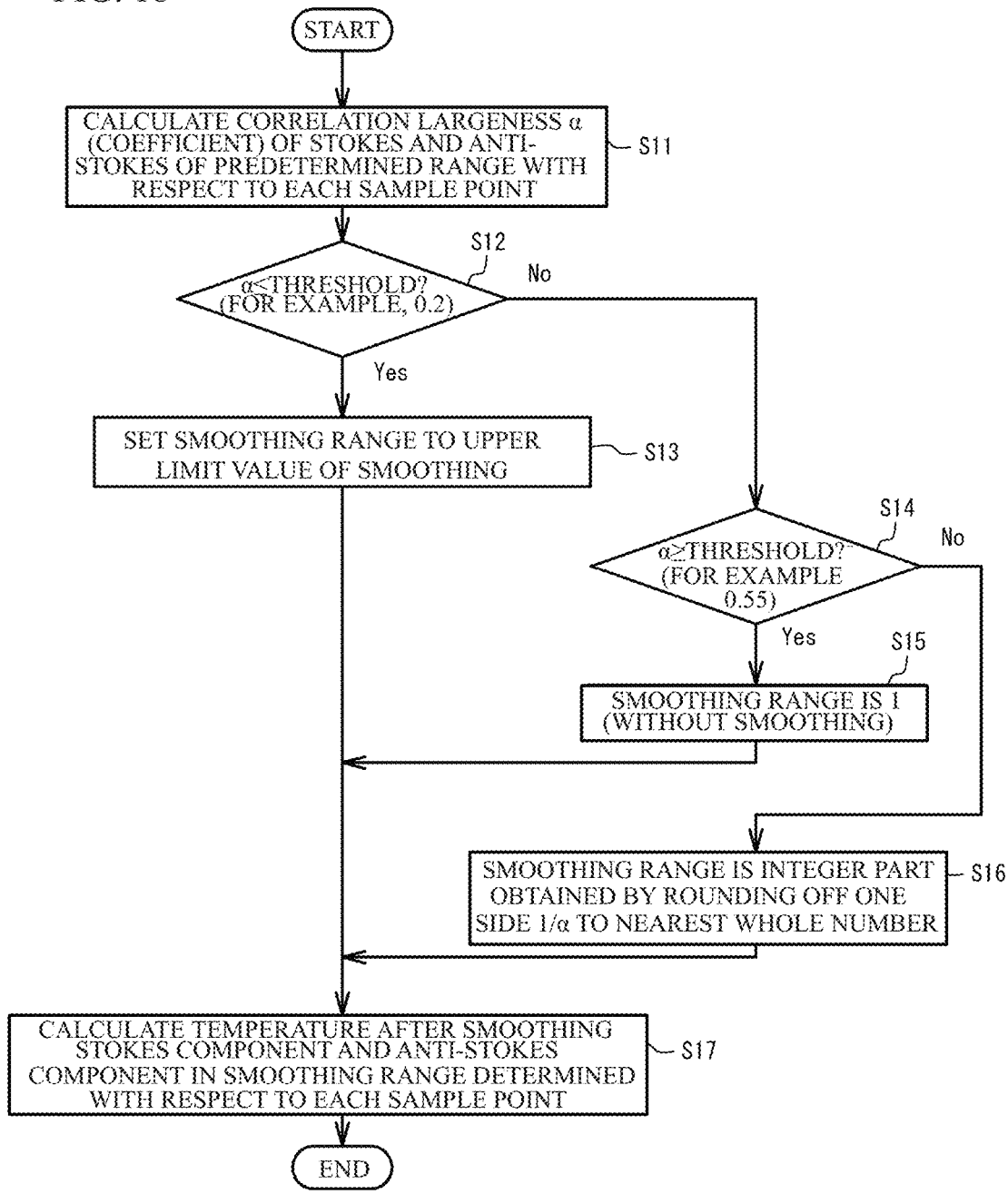
FIG. 18 illustrates another flowchart executed when a corrector corrects a temperature measured by a temperature measurer.

For example, FIG. 18 illustrates another example of a flowchart executed when the temperature measurement device 100 performs a temperature measurement. Step S11 to Step S13 and Step S17 are the same as Step S1 to Step S3 and Step S5. When it is determined as "No" in Step S12, the corrector 23 determines whether the correlation coefficient α is equal to or more than a threshold (for example, 0.55) that is larger than the threshold of FIG. 12 (Step S14). When it is determined as "Yes" in Step S14, the corrector 23 substitutes 1 in the smoothing range (Step S15). When it is determined as "No" in Step S14, the corrector 23 substitutes an integer number of samples in the smoothing range of one side (Step S16). The integer number is obtained by rounding off 1/α to the nearest whole number. After execution of Step S13, Step S15 or Step S16, Step S17 is executed. In the process of FIG. 18, when the correlation coefficient is larger than a predetermined value, the smoothing is not performed.

When the temperature changing is very small in a noise, the correlation coefficient may become only 0.5 to 0.66. When a reciprocal number is rounded off to the nearest whole number, the number of element of smoothing (the number of samples) is 2. Therefore, three data including both sides are smoothed. However, the temperature changing is very small. Therefore, detection sensitivity may be further degraded. However, when a threshold is provided on a larger side of the correlation coefficient, it is possible to suppress the degradation of the detection sensitivity. Generally, when the correlation coefficient is 0.4 or less, the noise increases. Therefore, a problem does not specifically occur.

It is preferable that an upper limit width of the above-mentioned predetermined range obtained from the upper limit value of the smoothing illustrated in FIG. 16 and FIG. 18 is equal to or less than a primary component of the minimum heated length. This is because when the upper limit width exceeds the primary component width, a possibility that a smoothed signal is subjected to a large influence of a crosstalk of an adjacent signal becomes higher. When a calculated correlation coefficient is −1, the case is classified into a complete correlation. However, in the embodiment, the case is treated as a noise. This is because the Stokes component and the anti-Stokes component have a convex shape toward an upper side when the temperature increases, the Stokes component and the anti-Stokes component have a convex shape toward a lower side, and a noise must occur in a temperature changing period when a direction of the Stokes component is opposite to that of the anti-Stokes component.

In the embodiment, the Stokes component and the anti-Stokes component are smoothed in a smoothing range according to the largeness of the correlation between the Stokes component and the anti-Stokes component in a predetermined range including a predetermined sample point. It is therefore possible to correct the measured temperature. For example, when the correlation is small, a large noise appears. It is therefore preferable that both components are smoothed. In this case, it is possible to reduce the noise. And it is preferable that a range for smoothing is elongated as the correlation becomes smaller. In this case, the noise is reduced more. It is preferable that an upper limit is defined in the length of the smoothing range. In this case, redundancy of the smoothing range is suppressed, and the degradation of the temperature measurement accuracy is suppressed. When the correlation is small, the temperature changing around the sample point is small. Therefore, even if the smoothing is performed, the degradation of the temperature measurement is suppressed. On the other hand, when the correlation is large, the smoothing range is shortened or the correction is not performed. When the correlation is large, the temperature changing is large around the sample point. Therefore, influence of the noise is small. It is therefore possible to maintain the accuracy of the measured temperature. Accordingly, in the embodiment, it is possible to maintain the accuracy of the measured temperature and reduce the influence of a noise.

Other Examples

Figure 19:
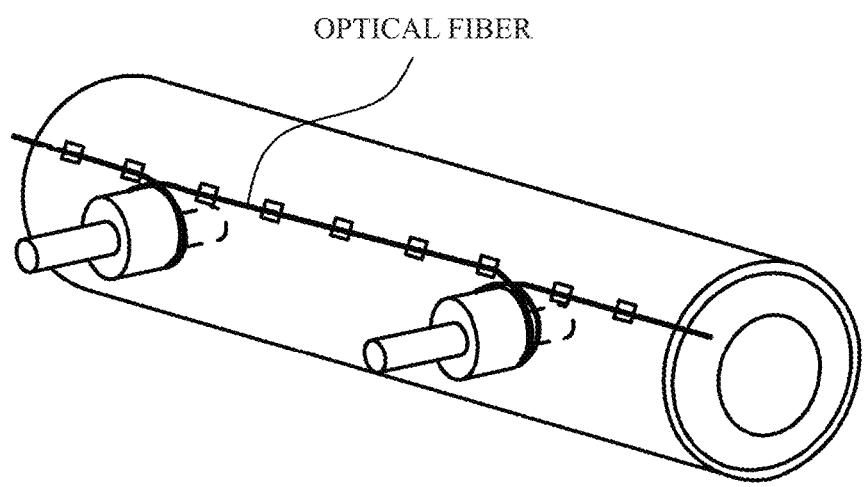
FIG. 19 illustrates another example.

The temperature measurement device 100 may be applied to various objects of which a temperature is to be measured. For example, as illustrated in FIG. 19, it is thought that an optical fiber is provided on a branch pipe of a pipe for transporting a raw material of a high temperature and a high pressure. A racking material and an outer metal board keeps a temperature of the pipe of the high temperature and the high pressure and protects the pipe. Even if a leak occurs because of corrosion of a joint of the pipe, there are many cases where the leak is not detected unless an emergency causing a fire accident occurs. And so, it is possible to precisely detect occurrence of leak at the joint early even if an outer temperature, an internal temperature or an internal pressure fluctuates, when an optical fiber is rolled around the joint and correlation relationships between changings of temperatures of positions of the optical fiber. As a method for comparing the correlations of the temperatures of positions of the optical fiber, there is a method for examining an outlier by generating a variance-covariance matrix having elements including a temperature of each position of the optical fiber and using a Mahalanobis distance or an MSD method.

Figure 20:
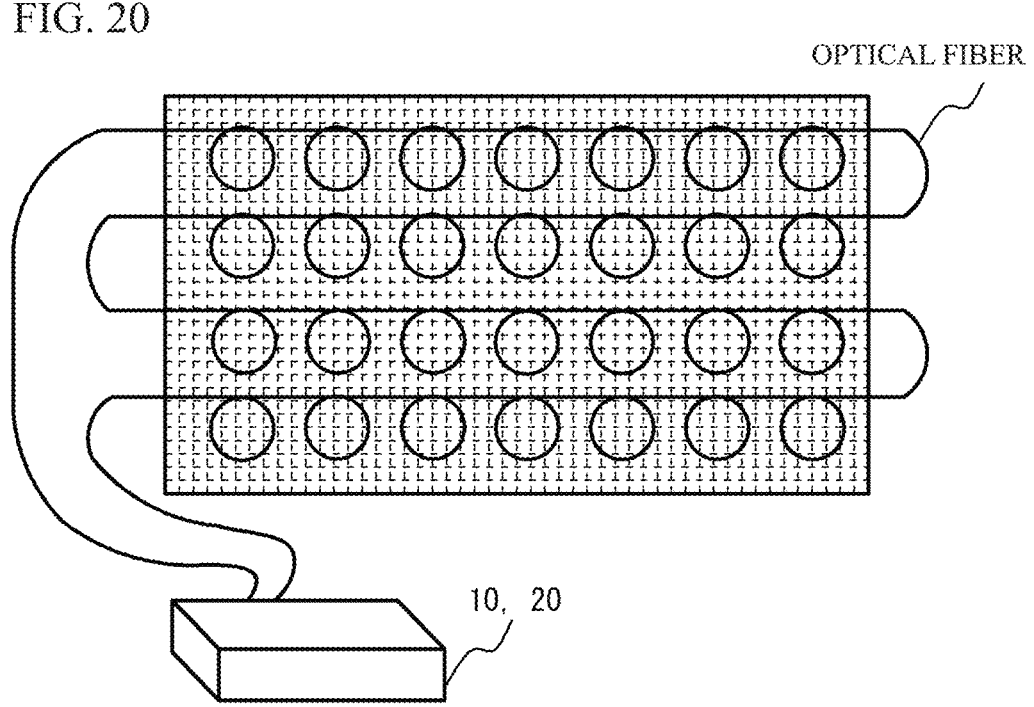
FIG. 20 illustrates another example.

FIG. 20 illustrates a single optical fiber applied to a method for measuring a temperature of a passed air with use of many rolling parts structured by the optical fiber. Each rolling part is rolled a few times around each fixed position with approximately the same diameter and is coupled with another next rolling part. It is possible to detect whether a wind passes through a sheet or a frame on which the optical fiber is provided and detect temperature distribution of the wind, when the measurement device 10 and the controller 20 in accordance with the above-mentioned embodiment are used, an average temperature of the rolling parts is calculated, and a gradation including representative temperatures of center coordinates of the rolling parts is generated. As the rolling number of each rolling part increases, the number of measurement points to be averaged increases, and a superficial measurement accuracy improved. Therefore, desirable measurement accuracy is achieved with a measurement of a short period. When the length of the optical fiber is shortened, an attenuation amount of the optical pulse is reduced. Therefore, the measurement accuracy is improved. In order to achieve desirable measurement accuracy with a shorter period, it is demanded that a temperature data itself is output with high accuracy. When the above-mentioned embodiment is applied, the demand is satisfied.

Figure 21A:
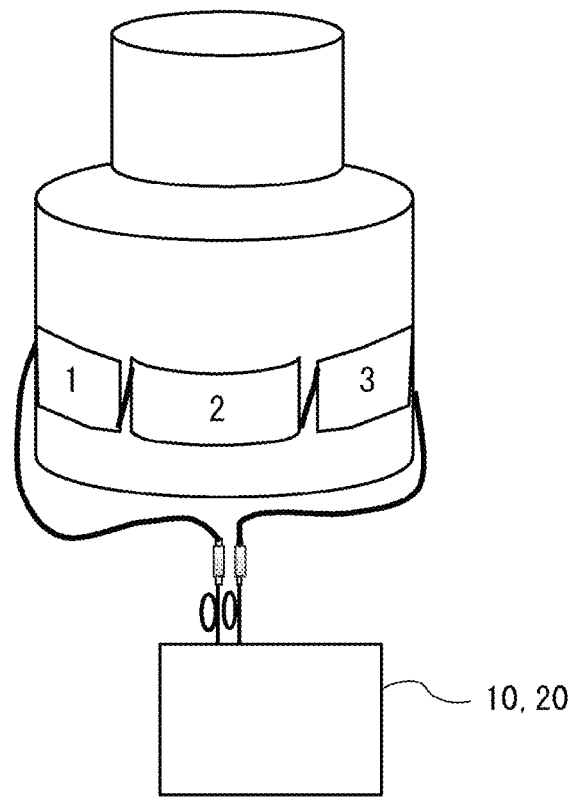
FIG. 21A and FIG. 21B illustrate another example.
Figure 21B:
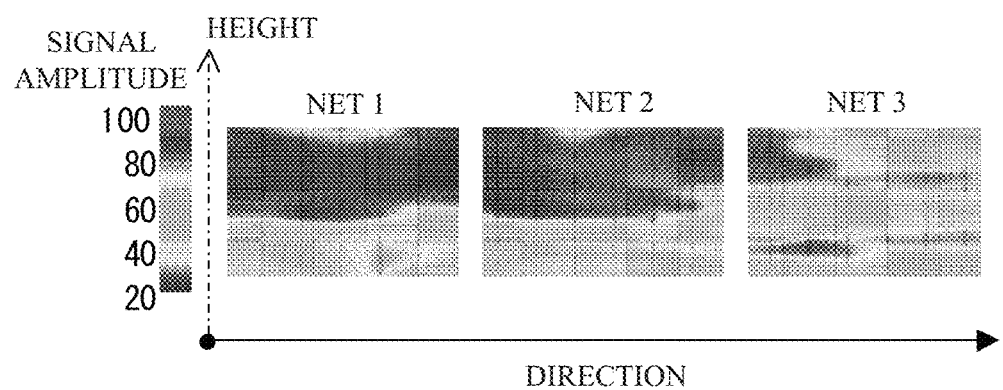

FIG. 21A and FIG. 21B illustrate an example in which fiber nets are provided on a surface of a melting furnace. In the fiber net, many rolling parts with use of a heat-resistant fiber are coupled. Each fiber net is coupled to each other. An entrance end of a distal fiber net and an exit end of another distal fiber net are coupled to the measurement device 10 and the controller 20. Thus, a measurement device of the double end method is structured. It is possible to visualize a superficial temperature condition of the melting furnace, when the relationship between the positions of the nets 1 to 3 and the temperature distribution is shown in two-dimensional gradations of FIG. 21B and the generated two-dimensional gradations are fitted on positions corresponding to directions of the nets with respect to a reference direction of the melting furnace. It is possible to measure the temperature with high accuracy when an unexpected temperature change abnormality is monitored with use of a threshold and when a precursory phenomenon of abnormality is analyzed from changing of the Mahalanobis distance or changing of a value calculated by the MSD method with use of a time course of the relative relationship between the temperature changings of the rolling parts of the nets, as well as the example of FIG. 19.

FIG. 22A and FIG. 22B illustrate an optical fiber applied to a system for performing an air-conditioning management with use of the optical fiber provided in a straight line on an upper position of a server rack in a data center. In a data center providing a housing service mainly, it may be forbidden to provide an optical fiber in a server rack. And so, as illustrated in FIG. 22A and FIG. 22B, the optical fiber is provided in a straight line on an upper part of an intake face of the server rack or the optical fiber is provided on an exhaust face side in a meandering shape. And, a temperature of a rack is measured by some methods in advance. An alarm threshold is set with respect to each length of the optical fiber corresponding to an upper part of each rack, by associating an allowable temperature degree detected from the optical fiber. Generally, a length of a server rack is 60 cm or 70 cm. When a sampling interval of data is 50 cm, the number of measurement point is one or two. Therefore, measurement accuracy of a measurement level of the double end method is desired. Therefore, it is possible to measure a temperature with high accuracy by applying the above-mentioned embodiment. It is possible to perform a control that an allowable degree is increased by energizing an air-conditioner when a temperature exceeds or is going to exceed a threshold. Accordingly, both energy saving and safety are achieved.

Figure 23:
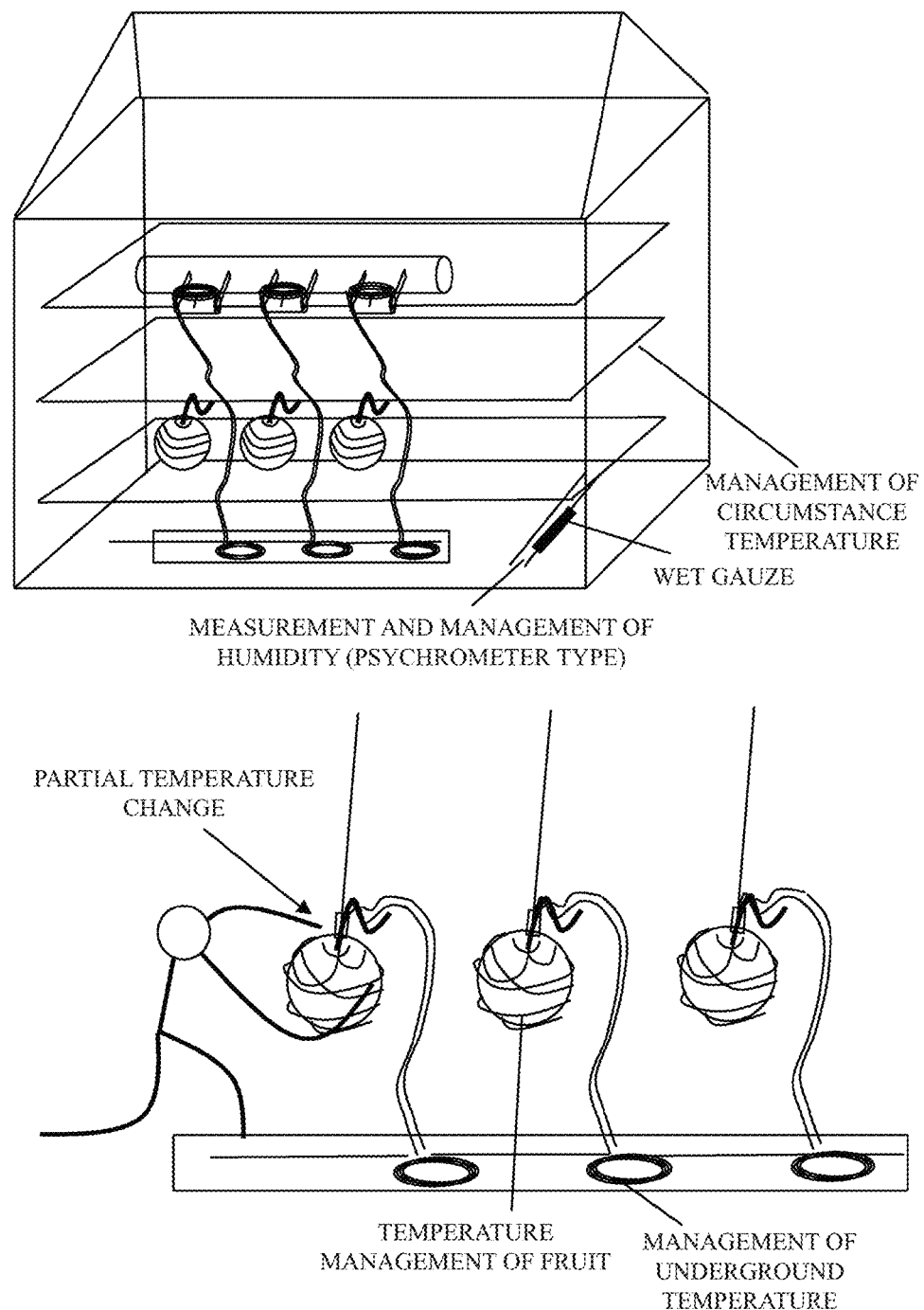
FIG. 23 illustrates another example.

FIG. 23 illustrates an example of a cultivation and a theft prevention of an expensive fruit or the like in a vinyl house. In the example of FIG. 23, crown melons are cultivated. An optical fiber for measuring an underground temperature, a circumstance temperature, a fruit temperature and so on is provided. Moreover, an optical fiber for a humidity management using the same principle as a psychrometer. In this case, it is possible to measure a temperature and humidity with use of a Raman scattering. When a thief pulls a melon for steeling the melon, an underground part of an optical fiber is pulled out and the temperature is sharply changes. It is therefore possible to report an alarm to an owner. In order to measure the sharp temperature changing precisely, it is preferable that measurement accuracy of a system is preferable. Similarly, it is preferable that measurement accuracy of the system is preferable, when a time course of each temperature is managed in detail, an integrated value is managed, and the owner cultivate the melons with a preferable condition. When the above-mentioned embodiment is used, these demands are solved.

Example 1

Figure 24A:
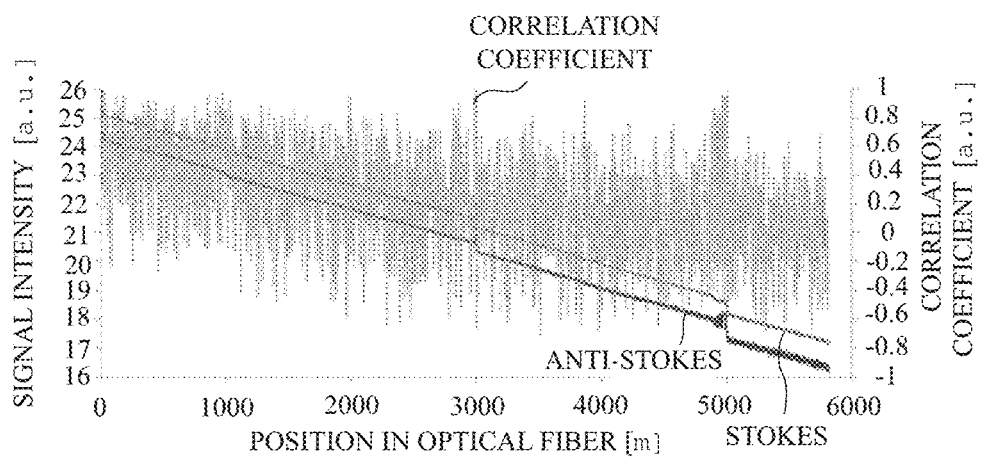
FIG. 24A to FIG. 24C illustrate a result of a case where an optical pulse is input into a first end.
Figure 24B:
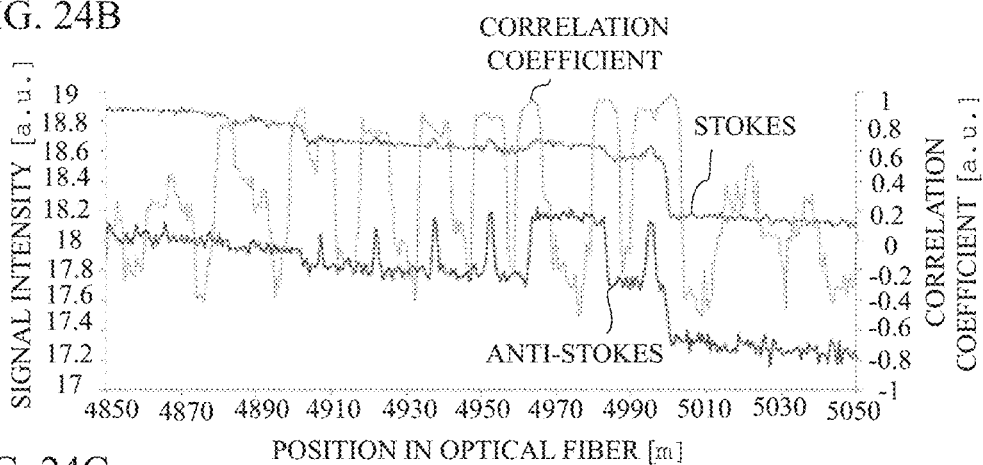
Figure 24C:
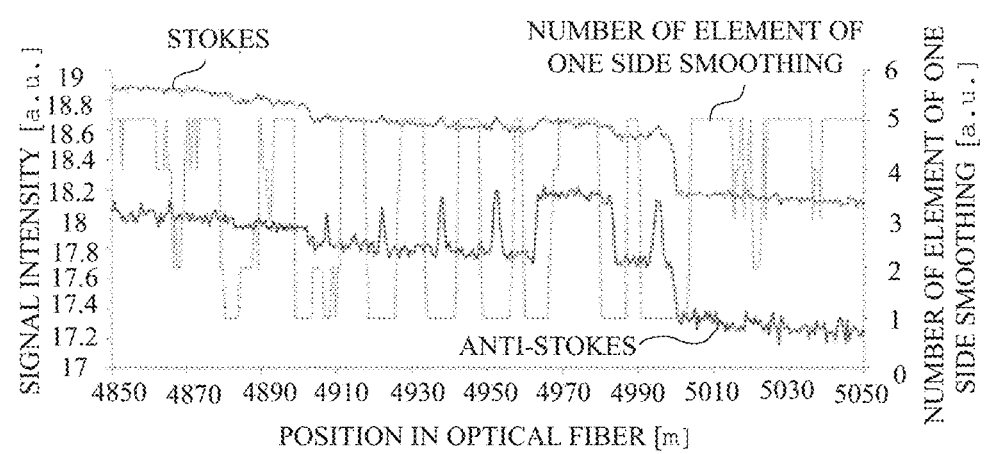

In accordance with the above-mentioned embodiment, a description will be given of a concrete example. FIG. 24A to FIG. 24C and FIG. 25 illustrate results of a case where an optical pulse is input into the first end (0 meter). FIG. 24A illustrates a relationship between a Stokes component and an anti-Stokes component, and a correlation coefficient of them. FIG. 24B illustrates an enlarged view around a region dipped into hot water. FIG. 24C illustrates a relationship between the Stokes component and the anti-Stokes component, and a number of element for smoothing of one side determined on the basis of the flowchart of FIG. 16. However, in the example, being different from FIG. 16, an upper limit value (including a currently focused position) is five. Therefore, a maximum value of the number of element for smoothing is 9.

Figure 25:
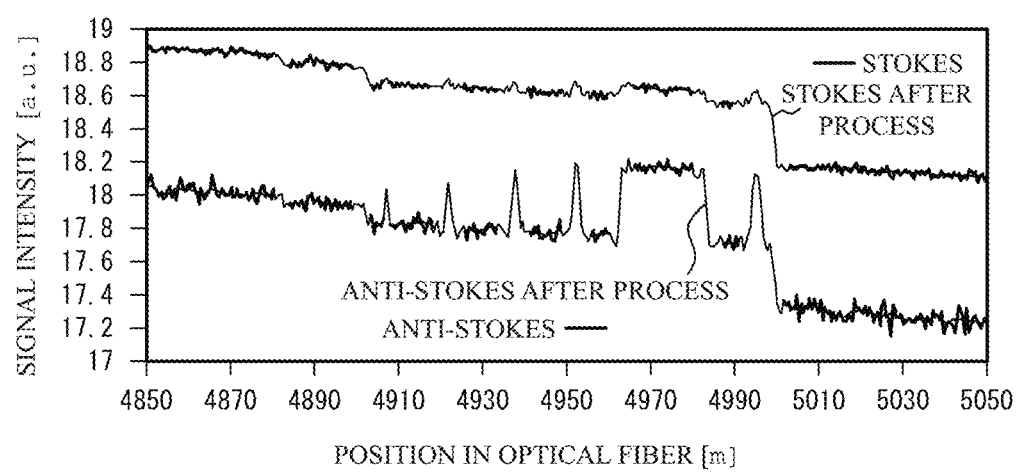
FIG. 25 illustrates a result of a case where an optical pulse is input into a first end.
Figure 26A:
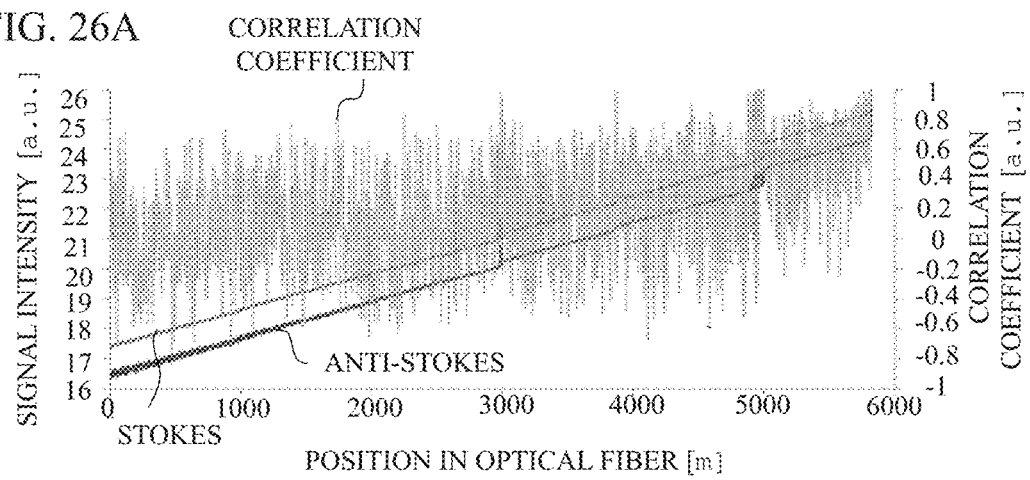
FIG. 26A to FIG. 26C illustrate a result of a case where an optical pulse is input into a second end (L meter)
Figure 26B:
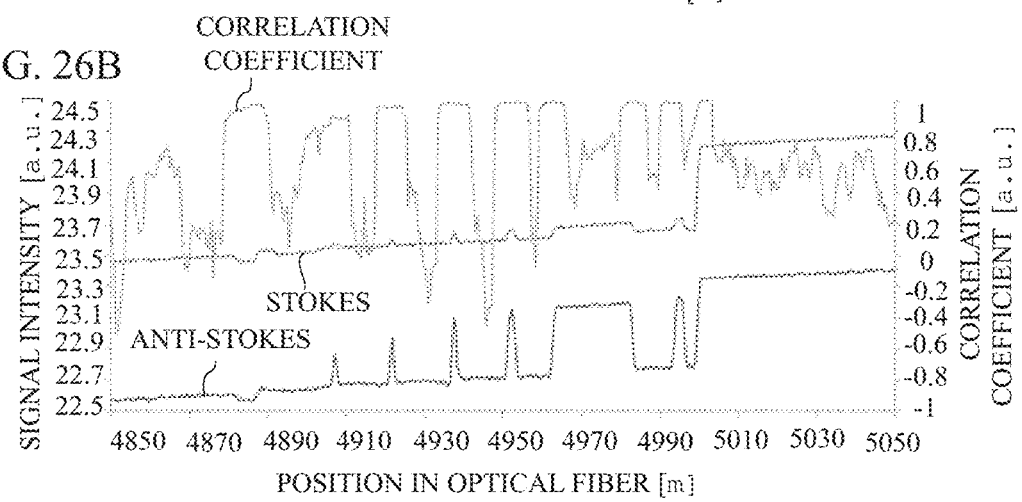
Figure 26C:
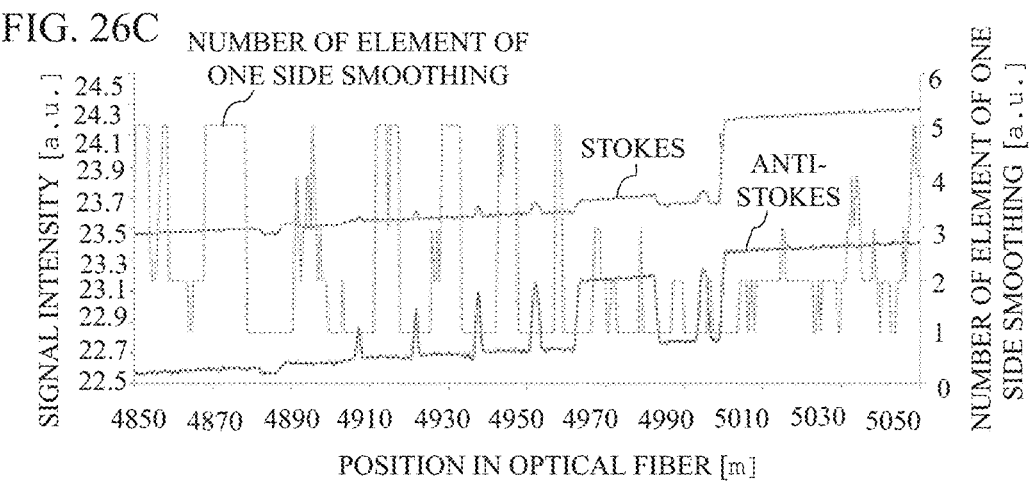
Figure 27:
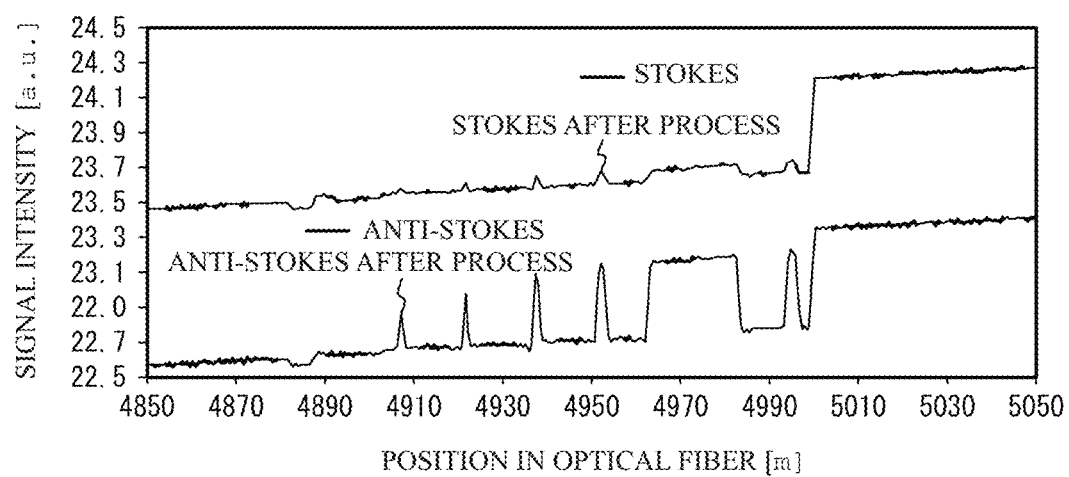
FIG. 27 illustrates a result of a case where an optical pulse is input into a second end (L meter)

When FIG. 24B is compared with FIG. 24C, the correlation coefficient gets closer to 1, the maximum value, when a temperature changing occurs and both of the Stokes component and the anti-Stokes component change, and the number of element for smoothing gets closer to 1 that is a minimum value. FIG. 25 illustrates a result in which the Stokes component and the anti-Stokes component are converted with use of FIG. 24C. In FIG. 25, compared to the Stokes component illustrated with a thick solid line, variability is suppressed in the Stokes component after the process. Compared to the anti-Stokes component illustrated with a thick solid line, variability is suppressed in the anti-Stokes component after the process. From FIG. 25, a component of the temperature changing is not lost, and a noise is suppressed.

FIG. 26A to FIG. 26C and FIG. 27 illustrate results of a case where the optical pulse is input into the second end (L meter). A relationship between FIG. 26A to FIG. 26C and FIG. 27 is the same as that between FIG. 24A to FIG. 24C and FIG. 25. At a position where a temperature changing is small, the correlation coefficient is small, and the number of element for smoothing is large. However, a noise is small as a whole. For example, when 4970 (m) to 5050 (m) is focused, the number of element for smoothing of FIG. 25 is smaller than that of FIG. 24A to FIG. 24C. From FIG. 27, there is little difference between the Stokes component and the anti-Stokes component before the process, and the Stokes component and the anti-Stokes component after the process. However, variability of the Stokes component after the process is suppressed with respect to the Stokes component illustrated with a thick solid line. Variability of the anti-Stokes component after the process is suppressed with respect to the anti-Stokes component illustrated with a thick solid line. From FIG. 27, a component of the temperature changing is not lost, and a noise is suppressed.

Figure 28:
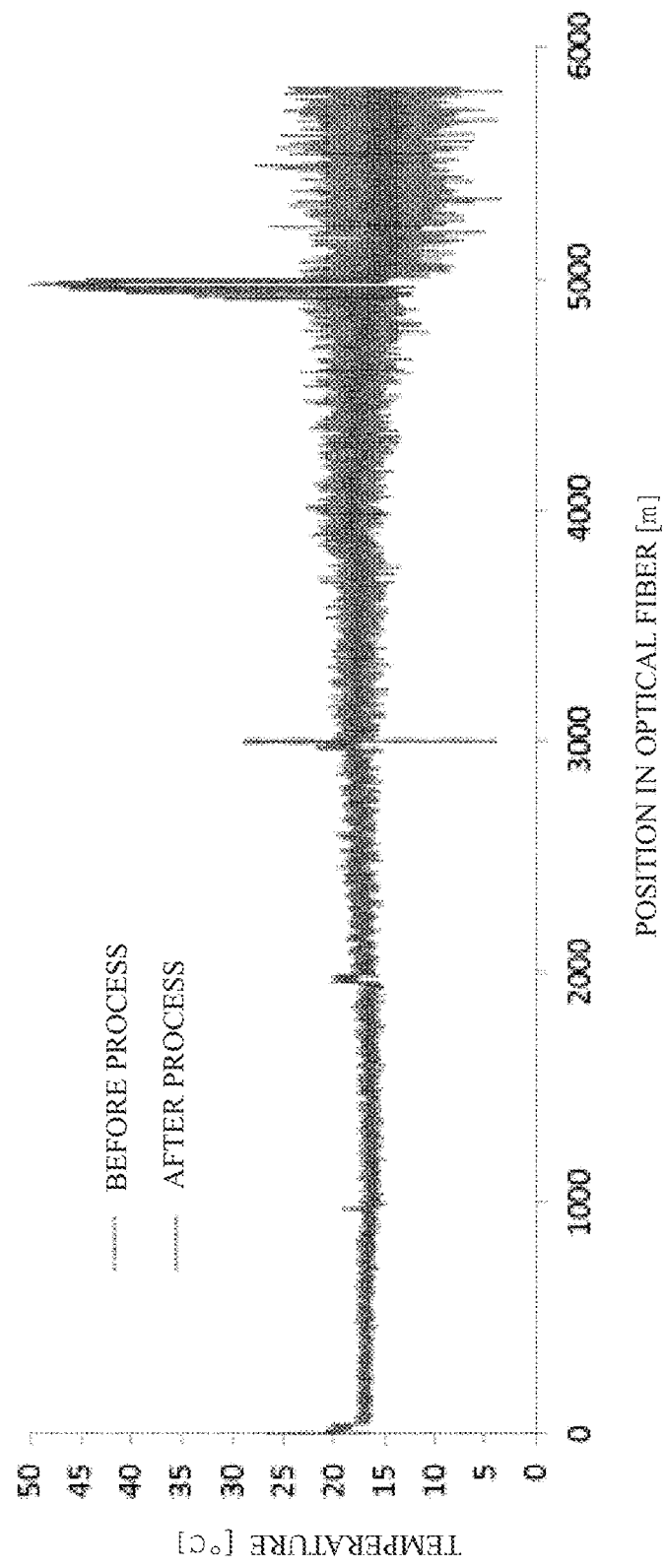
FIG. 28 illustrates temperature distribution obtained from FIG. 24A to FIG. 24C and FIG. 25.
Figure 29:
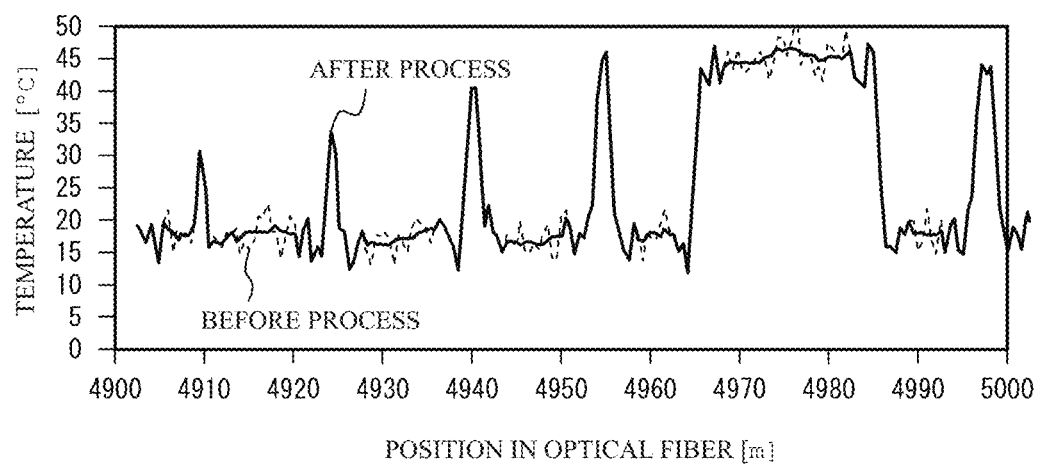
FIG. 29 illustrates a partially enlarged view of FIG. 28.
Figure 30:
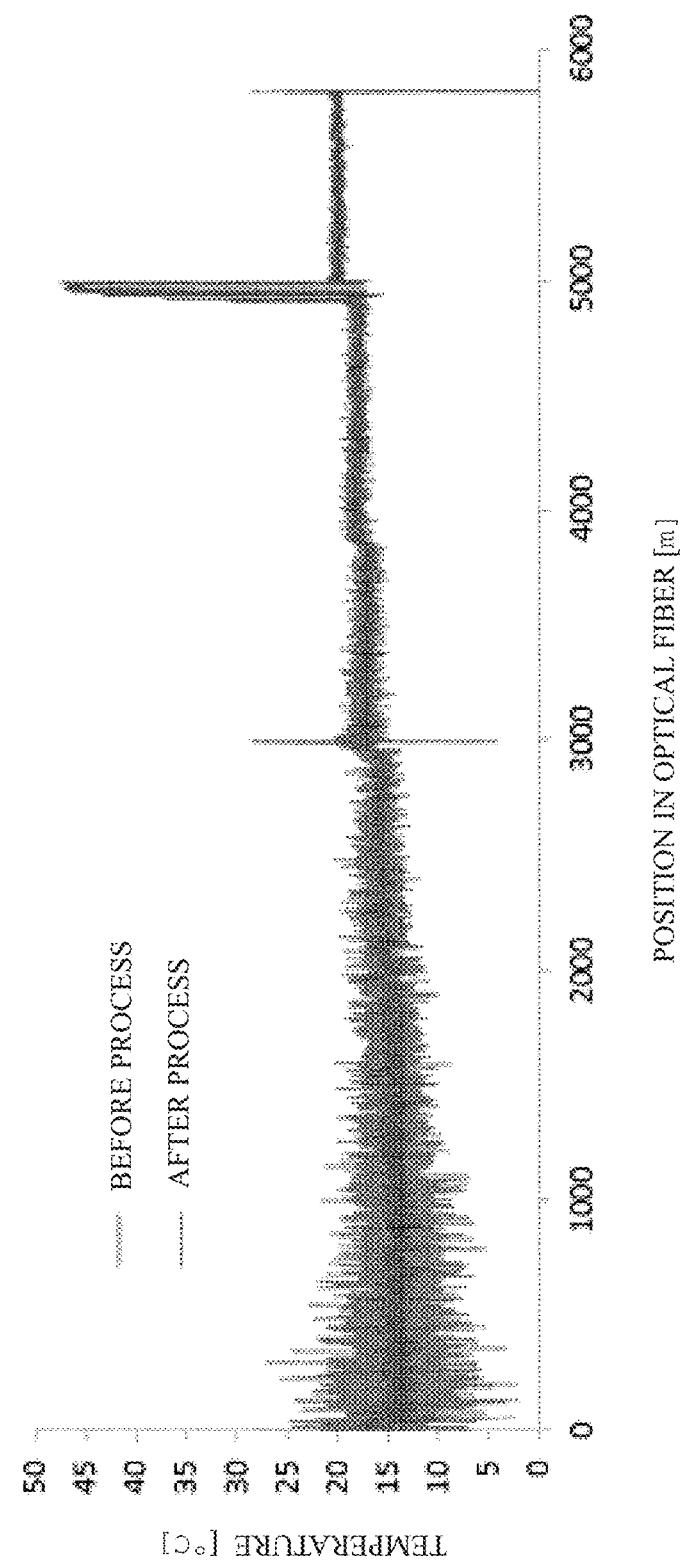
FIG. 30 illustrates temperature distribution obtained from FIG. 26A to FIG. 26C and FIG. 27.
Figure 31:
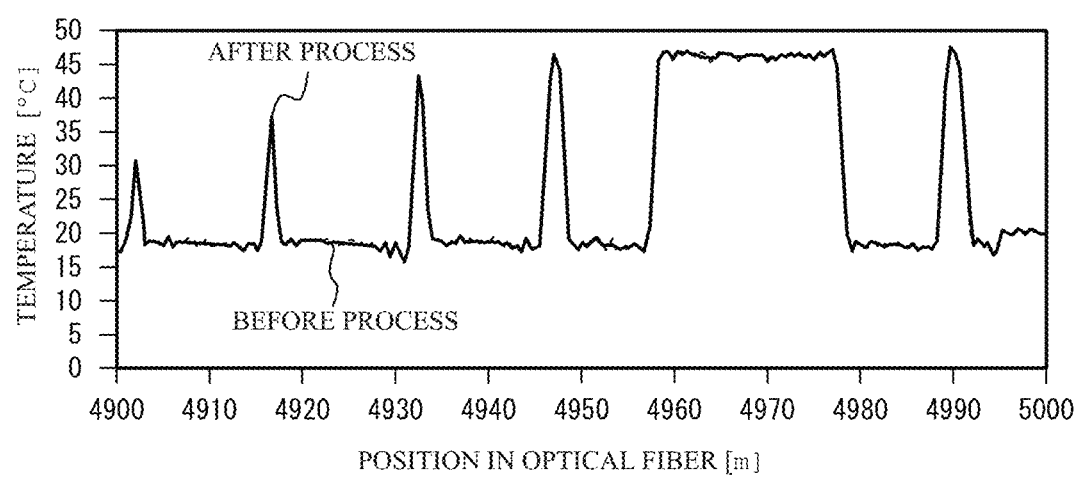
FIG. 31 illustrates a partially enlarged view of FIG. 30.

FIG. 28 and FIG. 29 illustrate temperature distribution obtained from FIG. 24A to FIG. 24C and FIG. 25. FIG. 29 illustrates a partial enlarged view of FIG. 28. FIG. 30 and FIG. 31 illustrate temperature distribution obtained from FIG. 26A to FIG. 26C and FIG. 27. FIG. 31 illustrates a partial enlarged view of FIG. 30. A temperature is calculated with use of the above-mentioned formula (1). At a position where the correlation coefficient is 1, the number of element for smoothing is 1. The temperature before the process is the same as that after the process. The gain and the offset value used after the process are the same as those used before the process. Therefore, the following formula (5) is obtained.

Temperature after process=gain/{offset−2×ln(light amount of anti-Stokes component after process/ light amount of Stokes component after process)}     (5)

Figure 32:
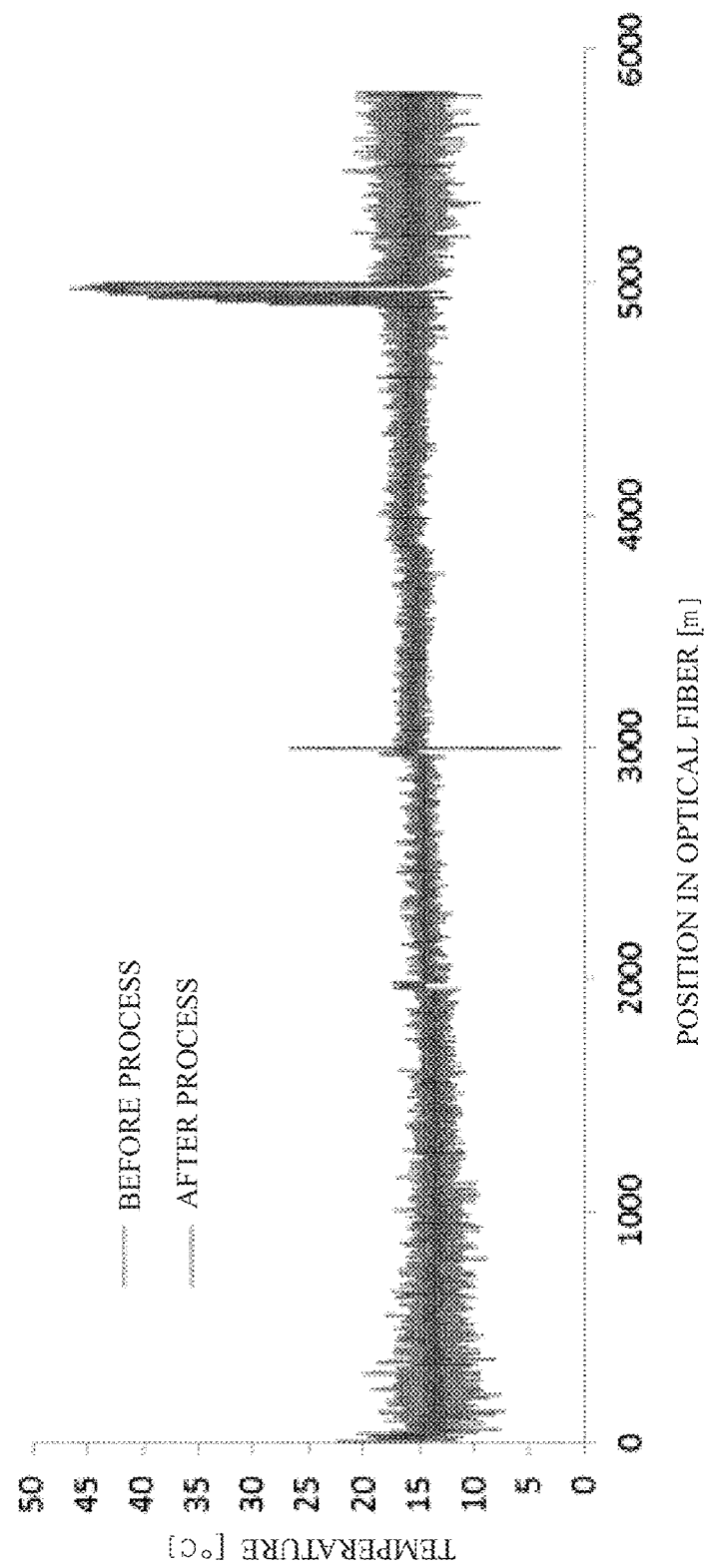
FIG. 32 illustrates a comparison between a loop measurement before applying an embodiment and the loop measurement after applying the embodiment.
Figure 33:
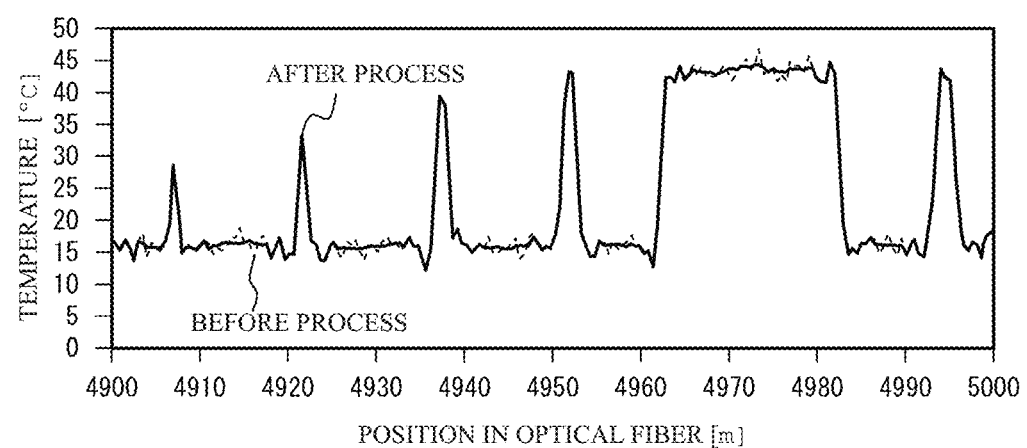
FIG. 33 illustrates a comparison between a loop measurement before applying an embodiment and the loop measurement after applying the embodiment.

From FIG. 28 to FIG. 31, a changing does not occur in the temperature changing. And, positions where a noise is suppressed and a temperature changing does not occur are smoothed. Thereby, temperature distribution has sharp distribution. FIG. 32 and FIG. 33 illustrate a comparison between the temperature distribution before applying the embodiment and the temperature distribution after applying the embodiment with respect to the loop measurement, with use of an average of the Stokes component after the process of a case where the optical pulse is input into the first end (0 meter) and the second end (L meter) and an average of the anti-Stokes component after the process. In the loop measurement, a reduction of signal components is suppressed, and a noise is reduced.

FIG. 34 illustrates a quantitative comparison of each temperature distribution after the process of FIG. 28 to FIG. 33, with respect to FIG. 11. At the position where the temperature changing occurs, there is no changing between before the process and after the process. Therefore, a standard deviation value 3σ at a terrace portion is compared. As illustrated in FIG. 34, a noise suppression of 20% to 70% is achieved. When original measurement accuracy is less than ±1 degree C., the noise suppression of 20% is achieved. When the original measurement accuracy is equal to or more than ±5 degrees C., the measurement accuracy of 70% is achieved. In a measurement time comparison, when the noise suppression of 73% is achieved with the above-mentioned embodiment, the measurement accuracy becomes 1/3.7 times. Therefore, in a case of identical measurement accuracy, when the measurement time before the process is 14, the measurement time after the process is compressed to 1. During the loop measurement, the measurement accuracy at a region of 100 m to 200 m and a region of 5600 m to 5700 m is three times as that at a enter region of 2800 m to 2900 m. However, with the above-mentioned embodiment, the measurement accuracy difference is suppressed to 1.5 times.

Example 2

Figure 35:
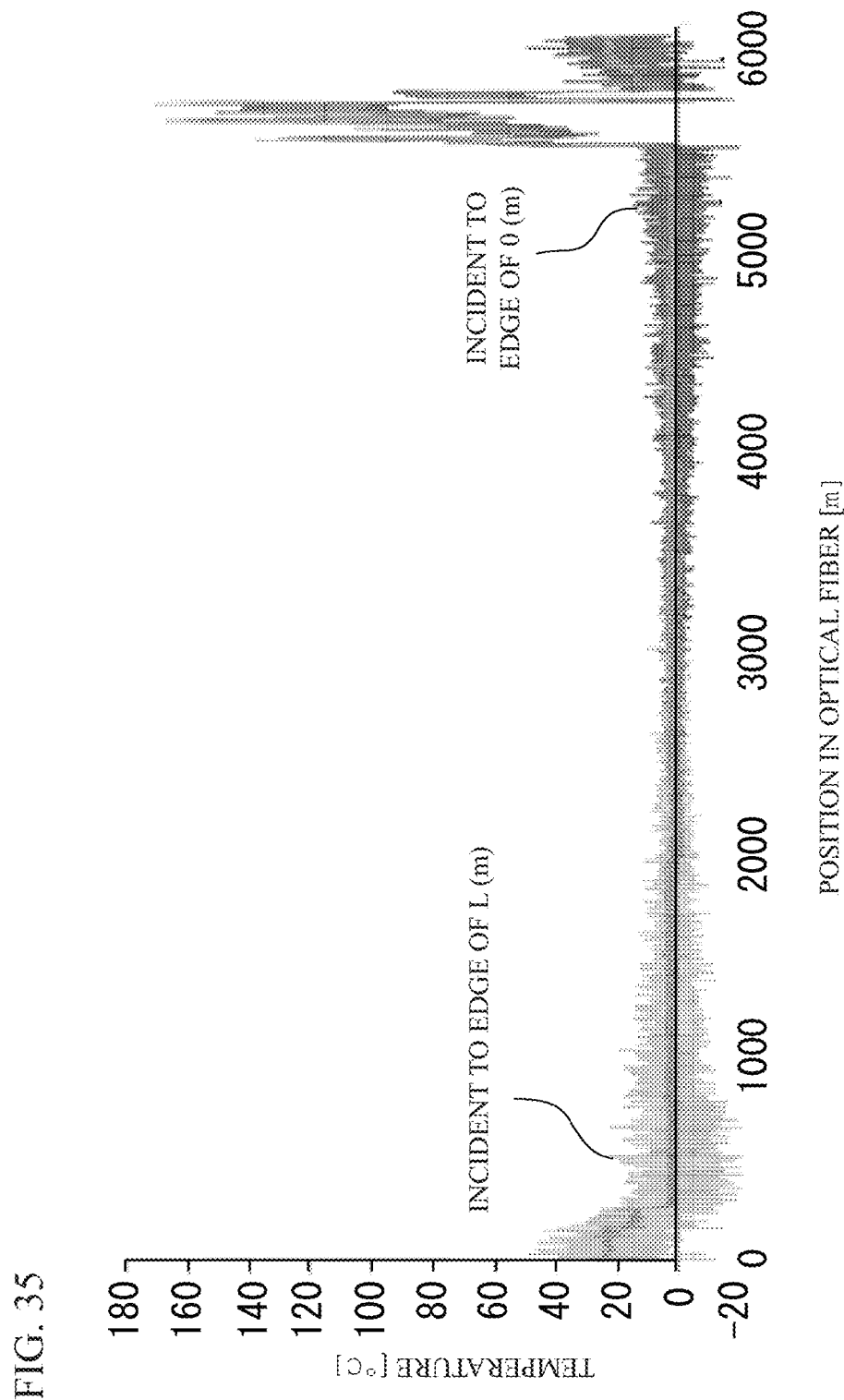
FIG. 35 illustrates temperature distribution of a case where an optical pulse is input into a first end and a second end.
Figure 36:
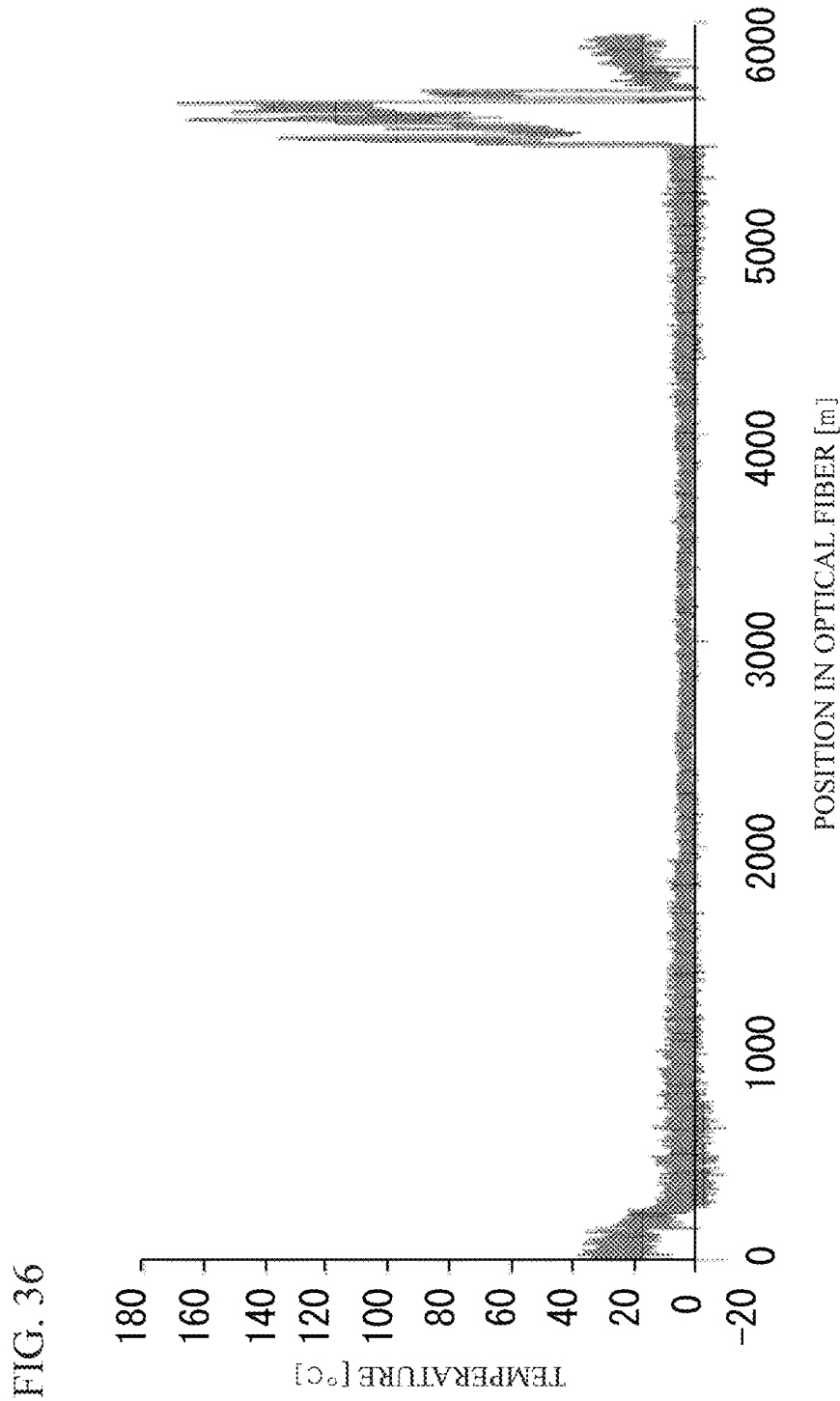
FIG. 36 illustrates temperature distribution during a loop measurement that is calculated from an average of a Stokes component and an average of an anti-Stokes component of a case where an optical pulse is input into both ends.

A description will be given of a concrete example of temperature distribution obtained with respect to a measurement object and a measurement cycle that are different from those of the example 1. FIG. 35 illustrates temperature distribution of a case where an optical pulse is input into the first end (0 meter) and the second end (L meter). FIG. 36 illustrates temperature distribution during a loop measurement that is calculated from an average of a Stokes component of the case where the optical pulse is input into the first end and another Stokes component of the case where the optical pulse is input into the second end and an average of an anti-Stokes component of the case where the optical pulse is input into the first end and another anti-Stokes component of the case where the optical pulse is input into the second end. In the example, in a region of 5400 m to 5700 m, temperature wave forms interfere with each other as in the case of FIG. 8. There is a temperature changing width of 150 degrees C. or more.

Figure 38:
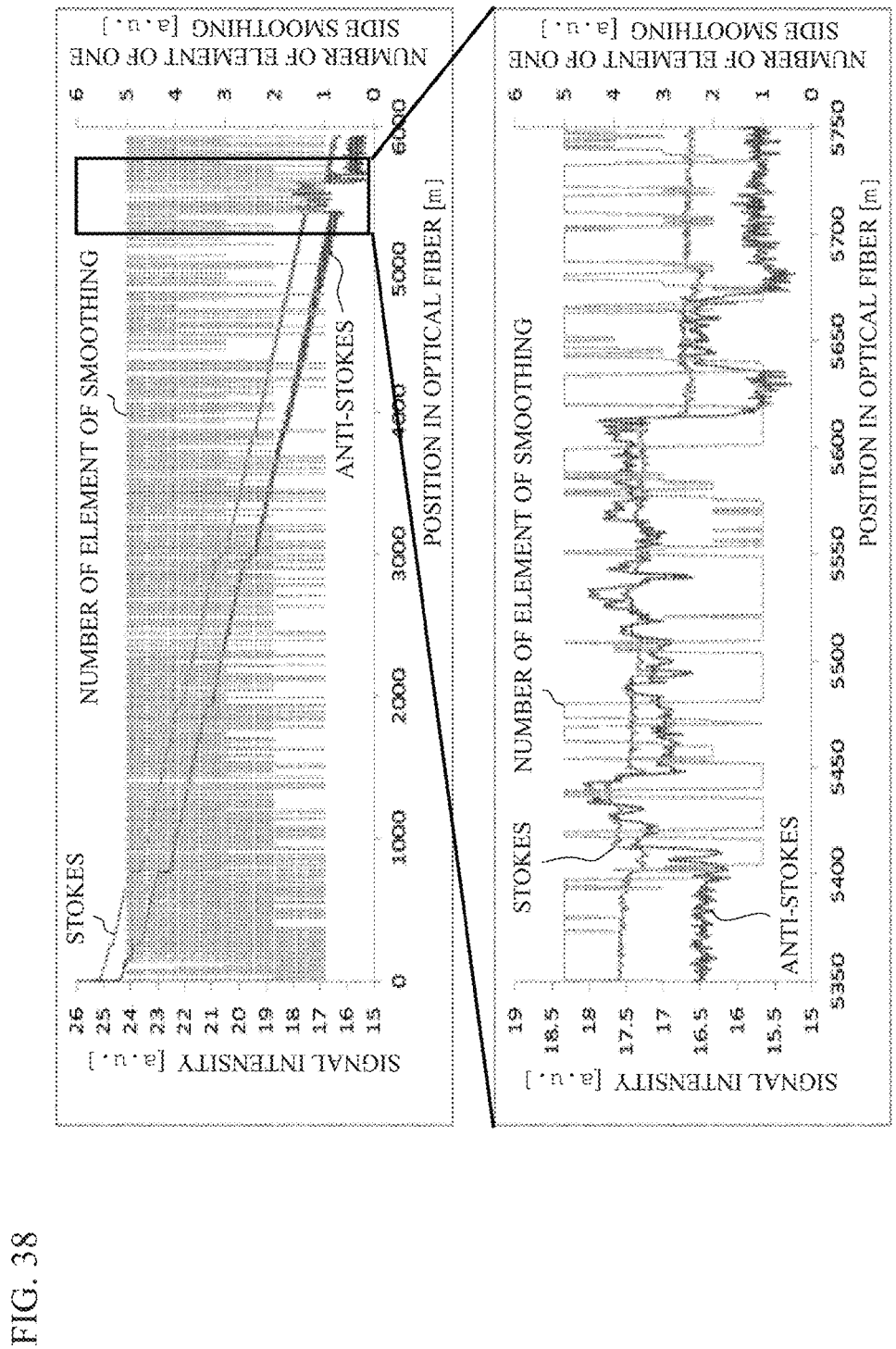
FIG. 38 illustrates a comparison between waveforms of a Stokes component and an anti-Stokes component and the number of element for smoothing of a case where an optical pulse is input into a first end.
Figure 39:
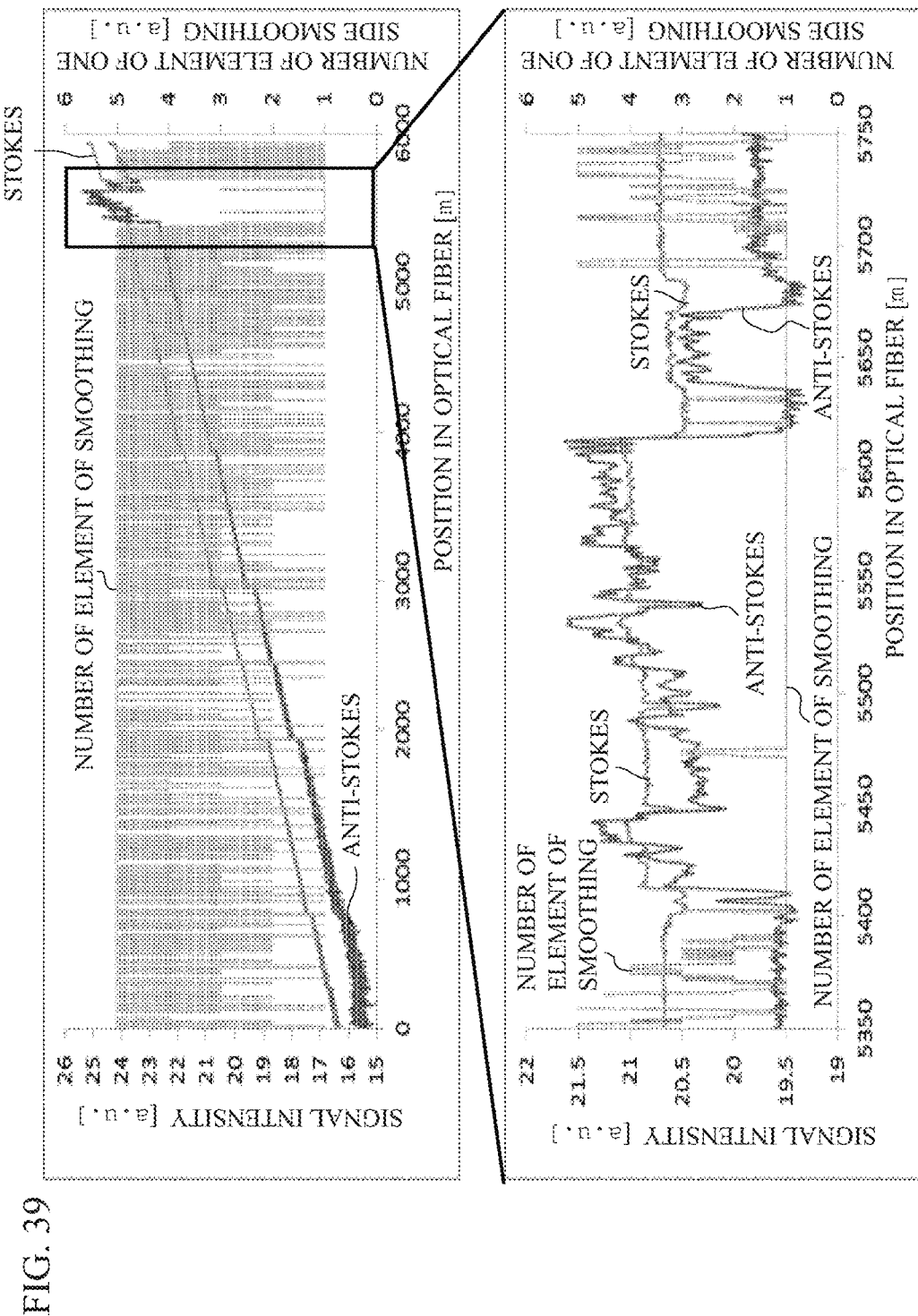
FIG. 39 illustrates a comparison between waveforms of a Stokes component and an anti-Stokes component and the number of element for smoothing of a case where an optical pulse is input into a second end.

FIG. 37 illustrates each measurement accuracy corresponding to FIG. 11. In the loop measurement, the measurement accuracy at the both ends exceeds ±10 degrees C. FIG. 38 illustrates a comparison between waveforms of the Stokes component and the anti-Stokes component of the case where the optical pulse is input into the first end (0 meter) and the number of element for smoothing. FIG. 39 illustrates a comparison between the waveforms of the Stokes component and the anti-Stokes component of the case where the optical pulse is input into the second end (L meter) and the number of element for smoothing.

The region of 5400 m to 5700 m is closer to the second end (L meter). Therefore, a noise is small. And, the number of element for smoothing is 1 when the optical pulse is input into the second end (L meter). That is, there are many cases where the Stokes component and the anti-Stokes component are output without smoothing. On the other hand, there are many cases where the number of element for smoothing is not 1 in a case where the optical pulse is input into the first end (0 meter). In a region where it is considered that there is no temperature changing, the process of the above-mentioned embodiment effectively functions, even if the waveforms are interference waveforms.

Figure 40A:
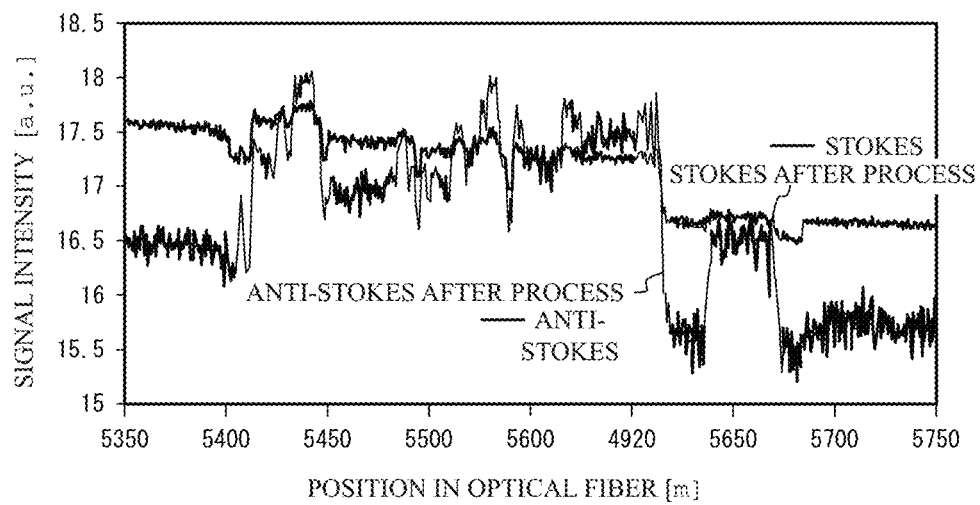
FIG. 40A illustrates a comparison between a Stokes component and an anti-Stokes component before a process and the Stokes component and the anti-Stokes component after the process of a case where an optical pulse is input into a first end.
Figure 40B:
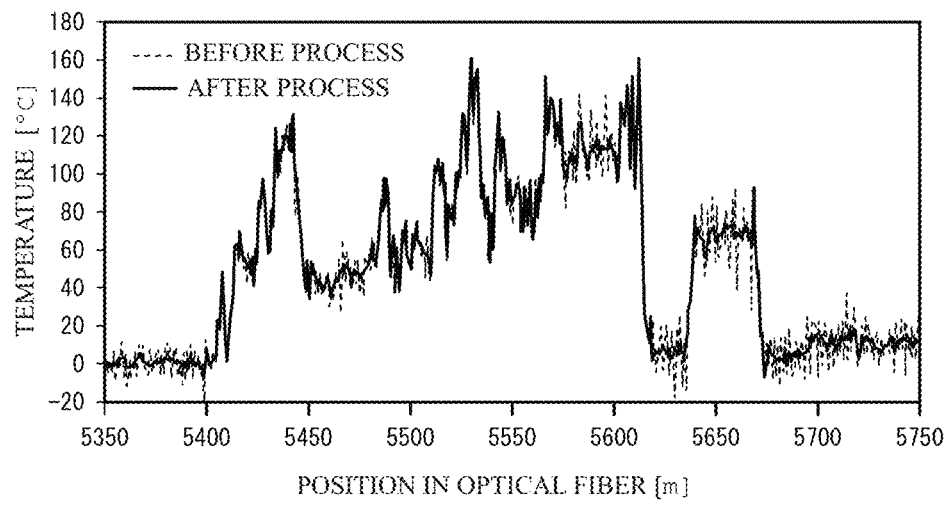
FIG. 40B illustrates an enlarged view of an interference waveform region.
Figure 41:
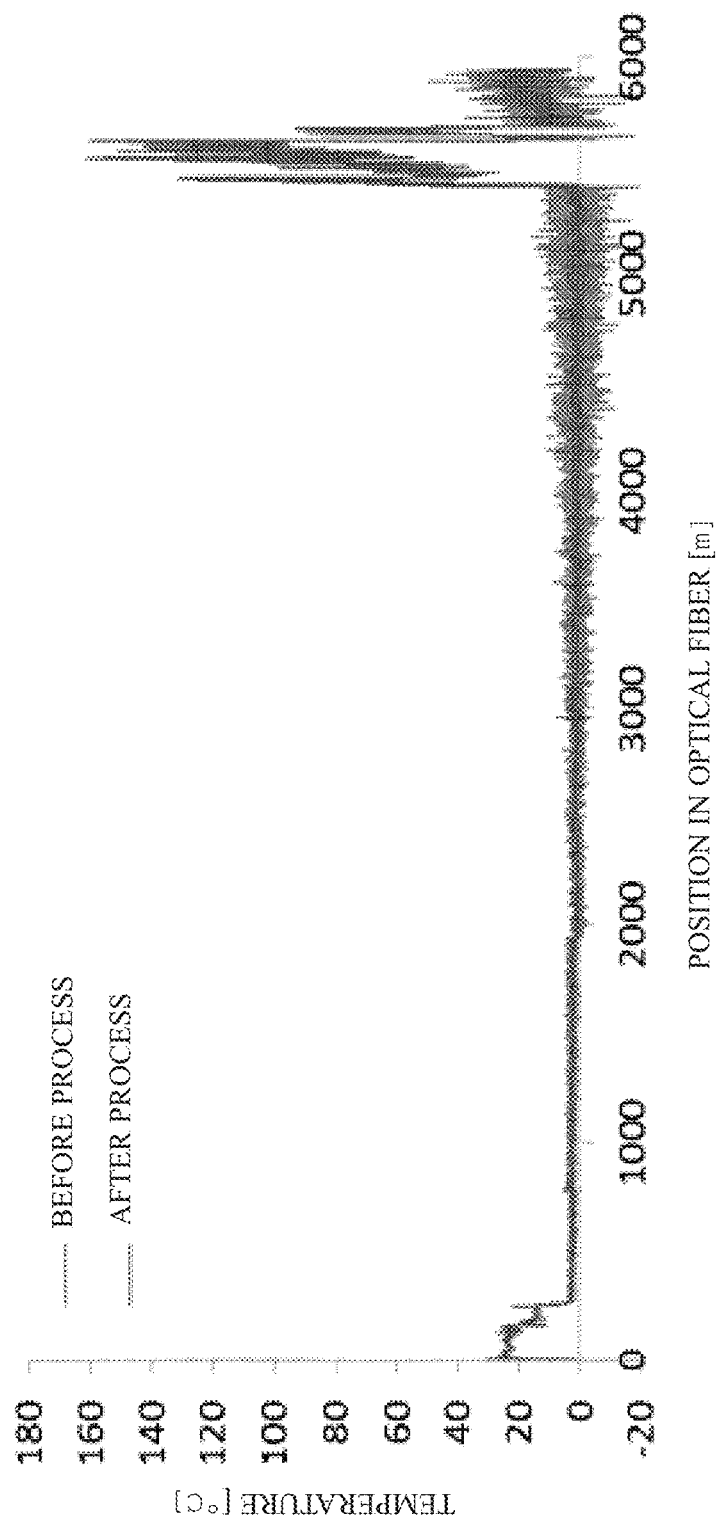
FIG. 41 illustrates a comparison of temperature distribution.
Figure 42A:
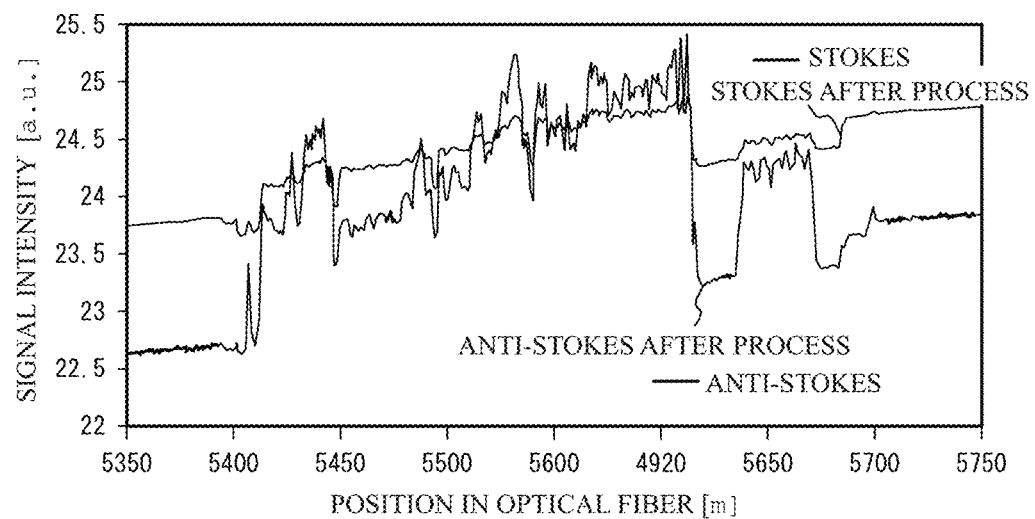
FIG. 42A and FIG. 42B illustrate a case where an optical pulse is input into a second end.
Figure 42B:
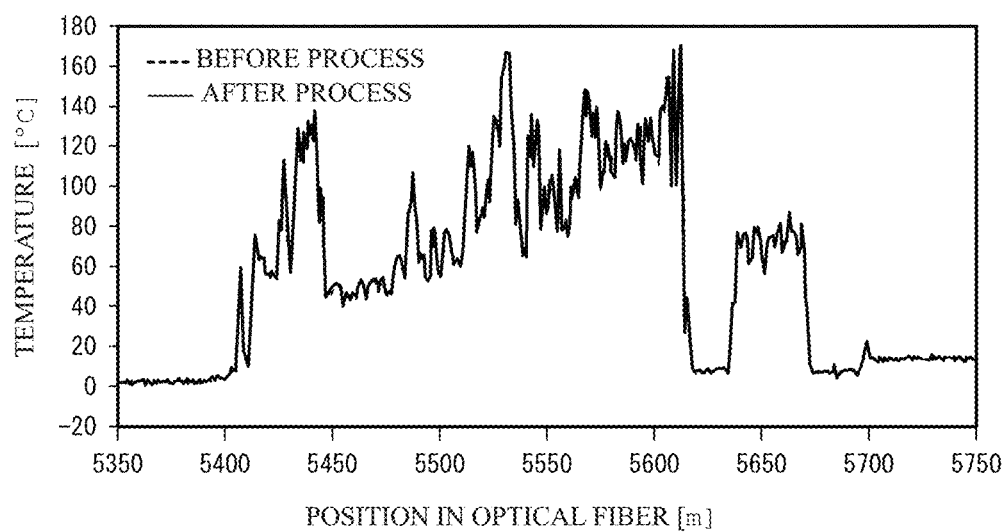
Figure 43:
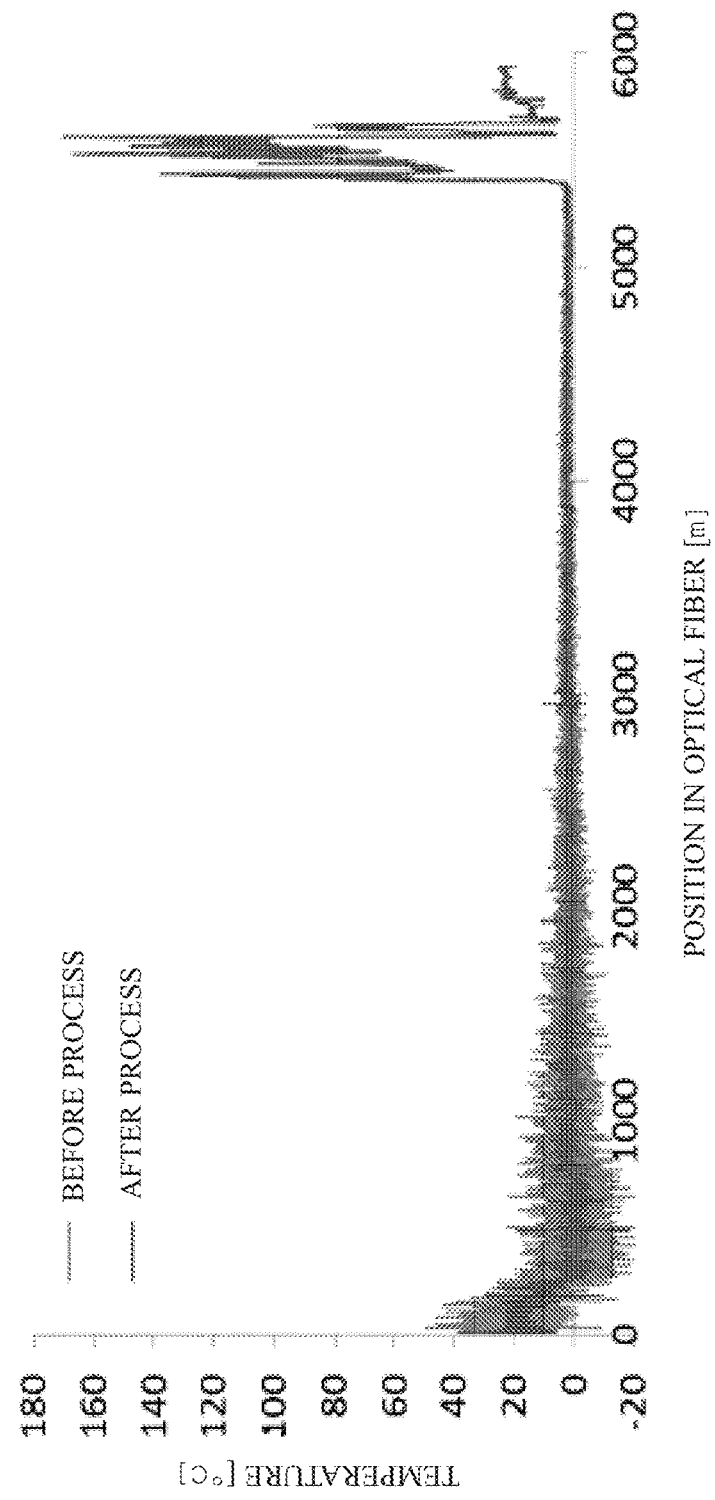
FIG. 43 illustrates a comparison of temperature distribution.

FIG. 40A illustrates a comparison between the Stokes component and the anti-Stokes component before the process and the Stokes component and the anti-Stokes component after the process of the case where the optical pulse is input into the first end (0 meter). FIG. 41 illustrates a comparison of temperature distribution of the case. FIG. 40B illustrates an enlarged view of an interference waveform region. In any figures, variability of the Stokes component and the anti-Stokes component after the process is suppressed with respect to variability of the Stokes component and the anti-Stokes component before the process. Similarly, FIG. 42A, FIG. 42B and FIG. 43 illustrate an example of the case where the optical pulse is input into the second end (L meter). In any figures, variability of the Stokes component and the anti-Stokes component after the process is suppressed with respect to variability of the Stokes component and the anti-Stokes component before the process.

When FIG. 40B is compared with FIG. 42B, a shape of the temperature distribution after the process of FIG. 40B is much closer to that of the temperature distribution of FIG. 42B than that of the temperature distribution before the process. Although the noise is suppressed, the noise is not suppressed in a region where the temperature changing occurs when the correlation is high, even if the temperature changing is sharp. Therefore, the process of the above-mentioned embodiment effectively functions.

Figure 44:
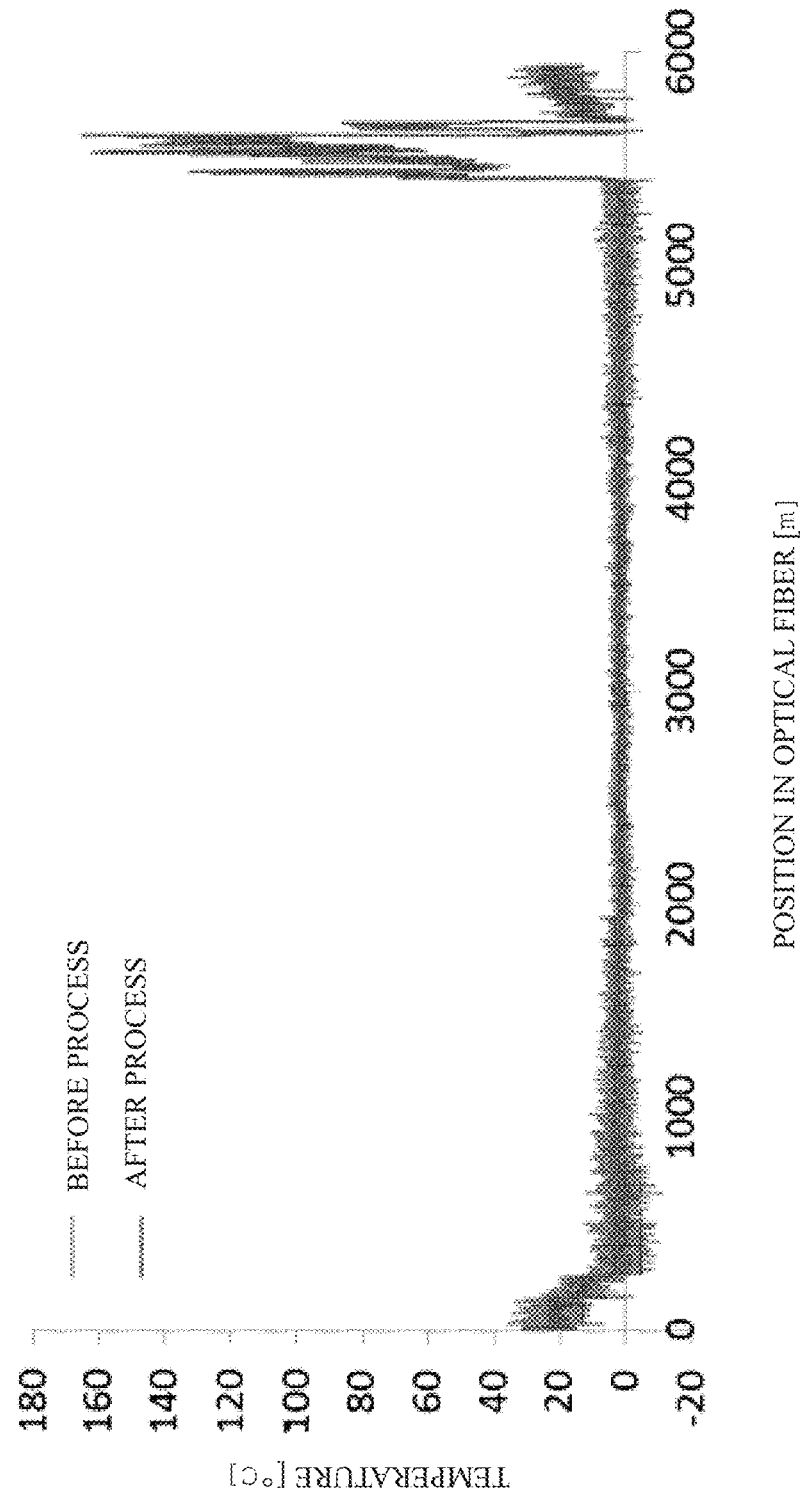
FIG. 44 illustrates temperature distribution of a loop type method obtained with use of a Stokes component and an anti-Stokes component after a process of FIG. 40A to FIG. 43.
Figure 45:
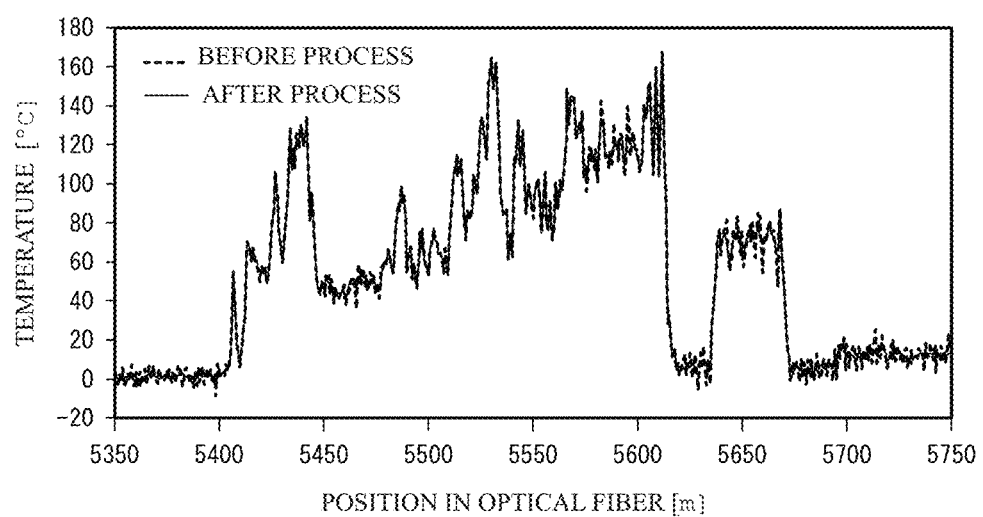
FIG. 45 illustrates temperature distribution of a loop type method obtained with use of a Stokes component and an anti-Stokes component after a process of FIG. 40A to FIG. 43.

FIG. 44 and FIG. 45 illustrate temperature distribution of the case of the loop type measurement with use of the Stokes component and the anti-Stokes component after the process of FIG. 40A to FIG. 43. In this case, the process of the above-mentioned embodiment also effectively functions.

FIG. 46 illustrates measurement accuracy calculated from each waveform of FIG. 40A to FIG. 45 and a reduction rate with respect to FIG. 37. As illustrated in FIG. 46, a suppression of approximately 50% to 70% is achieved. It is thought that the suppression in a region of 5830 m to 5920 m of the case where the optical pulse is input into the second end (L meter) is maintained at 14%, because the original measurement accuracy is high, the temperature distribution does not have a terrace shape, and the temperature distribution has a large value and a small value to some extent. With respect to FIG. 37, there is little improvement in a ratio of measurement accuracy in a region of 300 m to 400 m and a region of 5830 m to 5920 m with respect to center region of 2800 m to 2900 m. In a view point of difference, although a temperature of the region of 300 m to 400 m and a temperature of the region of 5830 m to 5920 m were respectively higher than that of the center region by 8.3 degrees C. and 11.8 degrees C., the temperature differences are respectively reduced to 3.2 degrees C. and 5.3 degrees C.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A temperature measurement device comprising:
   a light source configured to input a light into an optical fiber;
   a detector configured to detect a Stokes component and an anti-Stokes component from a back scattering light from the optical fiber, with respect to a plurality of sample points of the optical fiber located at different positions in a length direction of the optical fiber;
   a memory; and
   a processor configured to execute a process, the process comprising:
   in a certain region of the optical fiber which is along the length direction of the optical fiber and which includes a sample point of the optical fiber, calculating a range of the optical fiber along the length direction of the optical fiber by calculating a number of sample points in accordance with a correlation degree between the Stokes component and the anti-Stokes component;
   smoothing the Stokes component and the anti-Stokes component in the range; and
   measuring a temperature of the sample point included in the range based on the Stokes component and the anti-Stokes component that are smoothed in the smoothing.

2. The temperature measurement device as claimed in claim 1, wherein, in the calculating, the number of the sample point in the range is increased as the correlation degree decreases.

3. The temperature measurement device as claimed in claim 1, wherein, in the calculating, an upper limit value of the certain region is set when the correlation degree is less than a first threshold.

4. The temperature measurement device as claimed in claim 3, wherein, in the calculating, the Stokes component and the anti-Stokes component are not smoothed at the sample point when the correlation degree is equal to or more than a second threshold that is larger than the first threshold.

5. The temperature measurement device as claimed in claim 1, wherein, in the calculating, a Pearson's product-moment correlation coefficient is used as the correlation degree.

6. The temperature measurement device as claimed in claim 1, wherein, in the calculating, a Spearman's rank correlation coefficient is used as the correlation degree.

7. The temperature measurement device as claimed in claim 1, wherein the certain region is set to be larger than a half-value width of minimum heated length response waveform and smaller than a primary component of the minimum heated length response waveform, the minimum heated length response waveform being obtained when a part of the optical fiber around the sample point is kept at a first constant temperature and a second constant temperature different from the first constant temperature is given to a minimum heated length section of which a center is the sample point.

8. The temperature measurement device as claimed in claim 1, further comprising:
   an optical switch configured to alternately input the light into a first end and a second end of the optical fiber at a predetermined cycle,
   wherein, in the measuring, an average of correction results before and after switching of the optical switch is calculated.

9. A temperature measurement method comprising:
   detecting a Stokes component and an anti-Stokes component from a back scattering light from an optical fiber into which a light is input from a light source, with respect to a plurality of sample points of the optical fiber located at different positions in a length direction of the optical fiber;
   in a certain region of the optical fiber which is along the length direction of the optical fiber and which includes a sample point of the optical fiber, calculating a range of the optical fiber along the length direction of the optical fiber by calculating a number of sample points in accordance with a correlation degree between the Stokes component and the anti-Stokes component;
   smoothing the Stokes component and the anti-Stokes component in the range; and
   measuring a temperature of the sample point included in the range based on the Stokes component and the anti-Stokes component that are smoothed in the smoothing.

10. The temperature measurement method as claimed in claim 9, wherein, in the calculating, the number of the sample point in the range is increased as the correlation degree decreases.

11. The temperature measurement method as claimed in claim 9, wherein, in the calculating, an upper limit value of the certain region is set when the correlation degree is less than a first threshold.

12. The temperature measurement method as claimed in claim 11, wherein, in the calculating, the Stokes component and the anti-Stokes component are not smoothed at the sample point when the correlation degree is equal to or more than a second threshold that is larger than the first threshold.

13. The temperature measurement method as claimed in claim 9, wherein, in the calculating, a Pearson's product-moment correlation coefficient is used as the correlation degree.

14. The temperature measurement method as claimed in claim 9, wherein, in the calculating, a Spearman's rank correlation coefficient is used as the correlation degree.

15. The temperature measurement method as claimed in claim 9, wherein the certain region is set to be larger than a half-value width of minimum heated length response waveform and smaller than a primary component of the minimum heated length response waveform, the minimum heated length response waveform being obtained when a part of the optical fiber around the sample point is kept at a first constant temperature and a second constant temperature different from the first constant temperature is given to a minimum heated length section of which a center is the sample point.

16. The temperature measurement method as claimed in claim 9, further comprising:

an optical switch configured to alternately input the light into a first end and a second end of the optical fiber at a predetermined cycle, wherein, in the smoothing, an average of correction results before and after switching of the optical switch is calculated.

17. A computer-readable, non-transitory medium storing a program that causes a computer to execute a process, the process comprising:

detecting a Stokes component and an anti-Stokes component from a back scattering light from an optical fiber into which a light is input from a light source, with respect to a plurality of sample points of the optical fiber located at different positions in a length direction of the optical fiber;

in a certain region of the optical fiber which is along the length direction of the optical fiber and which includes a sample point of the optical fiber, calculating a range of the optical fiber along the length direction of the optical fiber by calculating a number of sample points in accordance with a correlation degree between the Stokes component and the anti-Stokes component;

smoothing the Stokes component and the anti-Stokes component in the range; and measuring a temperature of the sample point included in the range based on the Stokes component and the anti-Stokes component that are smoothed in the smoothing.

* * * * *